United States Patent
Fang et al.

(10) Patent No.: US 8,781,509 B2
(45) Date of Patent: *Jul. 15, 2014

(54) INTERWORKING CIRCUIT SERVICE FALL BACK

(75) Inventors: Yonggang Fang, San Diego, CA (US); Rajesh Bhalla, Gahanna, OH (US); Xiaowu Zhao, Shenzhen (CN)

(73) Assignee: ZTE (USA) Inc., Morristown, NJ (US)

( * ) Notice: Subject to any disclaimer, the term of this patent is extended or adjusted under 35 U.S.C. 154(b) by 532 days.

This patent is subject to a terminal disclaimer.

(21) Appl. No.: 12/777,255

(22) Filed: May 10, 2010

(65) Prior Publication Data

US 2010/0317378 A1  Dec. 16, 2010

Related U.S. Application Data

(60) Provisional application No. 61/176,877, filed on May 8, 2009, provisional application No. 61/187,244, filed on Jun. 15, 2009.

(51) Int. Cl.
  *H04W 4/12* (2009.01)
(52) U.S. Cl.
  USPC ........ 455/466; 455/435.2; 455/436; 370/466; 370/355; 370/356

(58) Field of Classification Search
  USPC ............... 455/428, 560, 445, 466, 552.1; 370/352–354, 466, 912, 355, 356
  See application file for complete search history.

(56) References Cited

U.S. PATENT DOCUMENTS

| | | | | |
|---|---|---|---|---|
| 7,263,354 | B2 * | 8/2007 | Naim et al. | 455/422.1 |
| 8,036,607 | B2 * | 10/2011 | Mazawa et al. | 455/84 |
| 8,059,606 | B2 * | 11/2011 | Lee et al. | 370/333 |
| 8,169,968 | B1 * | 5/2012 | Stegall et al. | 370/331 |
| 2004/0057460 | A1 * | 3/2004 | Hwang | 370/468 |
| 2006/0114885 | A1 * | 6/2006 | Baek et al. | 370/352 |
| 2007/0097924 | A1 * | 5/2007 | Martinovich et al. | 370/332 |
| 2007/0173224 | A1 * | 7/2007 | Buckley et al. | 455/404.1 |
| 2008/0125111 | A1 * | 5/2008 | Durig et al. | 455/426.1 |
| 2009/0022104 | A1 * | 1/2009 | Cherian et al. | 370/331 |
| 2009/0124224 | A1 * | 5/2009 | Hildebrand et al. | 455/150.1 |
| 2009/0176513 | A1 * | 7/2009 | Bosch et al. | 455/458 |
| 2009/0245200 | A1 * | 10/2009 | Cakulev et al. | 370/331 |
| 2010/0267383 | A1 * | 10/2010 | Konstantinou et al. | 455/435.2 |

* cited by examiner

*Primary Examiner* — Kamran Afshar
*Assistant Examiner* — Farideh Madani
(74) *Attorney, Agent, or Firm* — Perkins Coie LLP

(57) ABSTRACT

Techniques, apparatuses, and systems can include mechanisms for interworking circuit service fallback.

52 Claims, 20 Drawing Sheets

| Field | Length (bits) |
|---|---|
| MessageID | 8 |
| MessageSequence | 7 |
| AckRequired | 1 |
| 1xLogicalChannel | 2 |
| 1xSignalingLength | 16 |
| 1xSignaling | 1XSignalingLength x 8 |

*Fig. 11*

| Field | Length (bits) |
|---|---|
| MessageID | 8 |
| AckSequence | 7 |
| Reserved | 1 |

*Fig. 12*

| Field | Length (bits) |
|---|---|
| MessageID | 8 |
| AckSequence | 7 |
| RejectReason | 8 |
| Reserved | 1 |

*Fig. 13*

| Field | Length (bits) |
|---|---|
| MessageID | 8 |
| Reserved | TBD |

*Fig. 14*

INTERWORKING CIRCUIT SERVICE FALL BACK

PRIORITY CLAIM AND CROSS REFERENCE TO RELATED APPLICATION

This patent document claims the benefit of the priority of U.S. Provisional Application Ser. No. 61/176,877, filed May 8, 2009, entitled "INTERWORKING CIRCUIT SERVICE FALL BACK," and claims the benefit of the priority of U.S. Provisional Application Ser. No. 61/187,244, filed Jun. 15, 2009, entitled "INTERWORKING CIRCUIT SERVICE FALL BACK," the entire contents of which are incorporated by reference as part of the disclosure of this document.

BACKGROUND

This document relates to wireless inter technology communications in wireless communication systems.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station emits radio signal that carries data such as voice data and other data content to wireless devices. A base station can be referred to as an access point (AP) or access network (AN) or can be included as part of an access network or a base station subsystem (BSS). Further, a wireless communication system can include a core network that is in communication with one or more base stations. A base station can transmit a radio signal on a forward link (FL), also called a downlink (DL), to one or more wireless devices. A wireless device can transmit a radio signal on a reverse link (RL), also called an uplink (UL), to one or more base stations.

A wireless device can use one or more different wireless technologies for communications. Various examples of wireless technologies include Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), evolved UTRAN (E-UTRAN), Long-Term Evolution (LTE), and Worldwide Interoperability for Microwave Access (WiMAX).

SUMMARY

This document describes technologies, among other things, for interworking circuit service fallback.

In one aspect, techniques, apparatuses, and systems for interworking circuit service fall back can include communicating with a first network based on a first wireless technology; communicating with a switching center corresponding to a second network based on a second wireless technology, where the switching center is configured to process messages for one or more devices on the second network; and transacting messages, in accordance with the second wireless technology, between a wireless device, communicating on the first network, and the switching center. Transacting messages can include communicating with the wireless device over the first network.

In another aspect, techniques, apparatuses, and systems for wireless communication systems can include communicating with a base station in accordance with a first wireless technology; and transacting messages, in accordance with a second wireless technology, with an interworking service (IWS) that is in communication with a switching center associated with the second wireless technology. The transacted messages can include Short Message Service (SMS) messages. The transacted messages can include paging messages. The wireless device can initiate a changeover from the first network to the second network. The switching center can initiate the changeover from the first network to the second network.

In another aspect, a wireless communication system can include circuitry to communicate with a first network based on a first wireless technology; circuitry to communicate with a switching center corresponding to a second network based on a second wireless technology different from the first wireless technology, where the switching center is configured to process messages for one or more devices on the second network; and circuitry to communicate transact messages, based on the second wireless technology, between a wireless device, communicating on the first network, and the switching center, where the transacting messages includes communicating with the wireless device over the first network.

In yet another aspect, a wireless communication system can include circuitry to communicate with a base station based on a first wireless technology; and circuitry to transact messages, based on a second wireless technology different from the first wireless technology, with an interworking service that is in communication with a switching center associated with the second wireless technology.

The details of one or more implementations are set forth in the accompanying attachments, the drawings, and the description below. Other features will be apparent from the description and drawings, and from the claims.

BRIEF DESCRIPTION OF THE DRAWINGS

FIG. 11 shows an example of a 1× signaling adaptation protocol 1× Transfer message.

FIG. 12 shows an example of 1× transfer acknowledgement message.

FIG. 13 shows an example of 1× transfer reject message.

FIG. 14 shows an example of 1× Circuit Switch Fall Back message.

DETAILED DESCRIPTION

Figure 1:
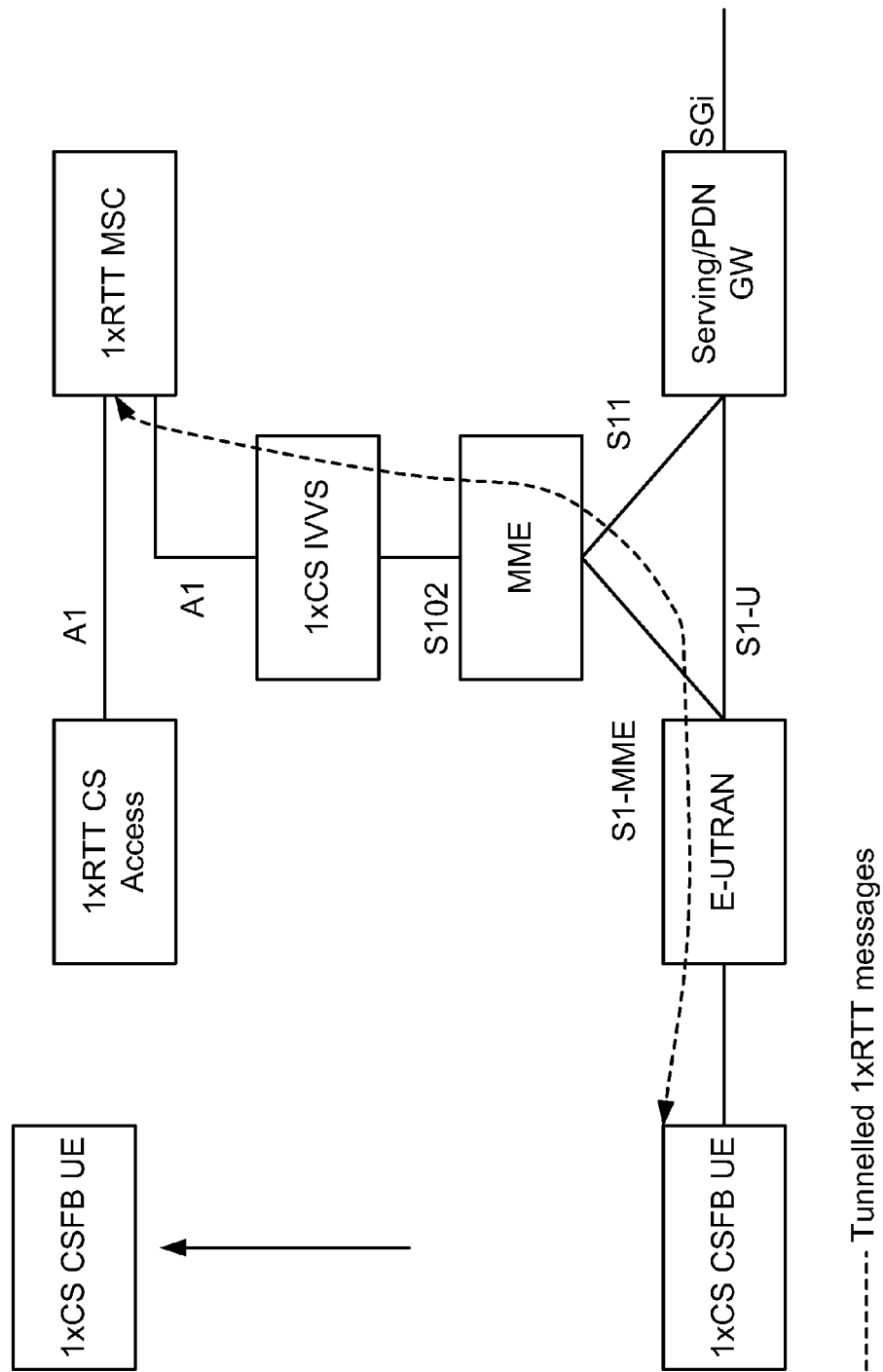
FIG. 1 shows an example of an interworking architecture reference model.

As the traditional voice services are moving toward the data centric services, the second and third generation wireless communication networks such as CDMA2000 are evolving to the next generation Long Term Evolution (LTE), which is based on OFDM and MIMO technologies. LTE can provide more network capacity and peak data rate with less latency for the data services. This is key for users' experiences on data service. However, due to the high efficiency of CDMA technology in voice services, CDMA2000 1× network may still be used to provide the voice services even after the LTE network is widely deployed and used in a couple of year later. Therefore there will be a long period that CDMA2000 1× circuit switching and packet network co-exists with LTE network. A wireless communication system can provide one or more interworking mechanisms to smooth interworking for co-existing of multi-technology networks, e.g., CDMA2000 1× interworking with LTE.

An interworking mechanism can be implemented between CDMA2000 1× and LTE such as a single radio voice call continuity (SRVCC) interworking mechanism and a 1× Circuit Switch Fall Back (CSFB) mechanism. A SRVCC interworking mechanism is to address the voice call (VoIP) originated from LTE network and handoff to CDMA2000 1× network when the mobile station is moving out of LTE coverage but within CDMA2000 1× network coverage. This approach assumes that IMS (IP Multimedia Subsystem) were widely deployed in operator's Core network and VoIP would be used to provide the major voice services.

In 1×CSFB, when the mobile station is connecting to LTE network for the data service, a mobile switching center (MSC) in the CDMA2000 network can page the mobile station for voice service, e.g., a mobile terminated (MT) call, or the user may want to use the mobile station to originate a voice call, e.g., a mobile originated (MO) call. Due to a single radio shared by the multiple technologies, such as CDMA2000 and LTE, the mobile station has to tune its radio to CDMA2000 1× frequency from LTE frequency after the mobile station has to fall back to CDMA2000 1× network to perform the voice service. During 1×CSFB, the data service over the LTE network can be suspended.

This document describes techniques, apparatuses, and systems for interworking between different wireless technologies, and discloses, among other things, details and implementation examples relating to interworking Circuit Service Fall Back (CSFB). A CSFB mechanism can bridge two or more different wireless technologies to allow communications between the two or more technologies. For example, a wireless device operating on a first wireless technology can fall back to a second wireless technology by, for example, generating messages based on the second wireless technology and transmitting them over the air in accordance with the first wireless technology. In another example, a wireless device is connected to a LTE network and would like to receive a page or SMS (Short Message Service) from a CDMA2000 1×MSC, or send a SMS to a cdma2000 1× network, the wireless device can use the technologies described herein to communicate cdma2000 1× based messages over the LTE network. In some implementations, a wireless device operating on a first wireless technology can fall back to a second wireless technology by encapsulating the protocol of the second wireless technology within a transmission payload associated with the first wireless technology.

Various examples of wireless communication systems that can implement the present techniques and systems include, among others, wireless communication systems based Code division Multiple Access (CDMA) such as CDMA2000 1×, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). For example, a wireless communication system can include one or more networks based on CDMA and one or more networks based on LTE.

FIG. 1 shows an example of an interworking architecture reference model. In this reference model, the wireless device, such as an UE, can attach to an E-UTRAN network to receive data services from LTE network. The 1×CSFB IWS is bridging the Mobility Management Entity (MME) and 1×RTT MSC so that 1×MSC and the wireless device could communicate over LTE network. During the wireless device connecting to LTE network, the IWS can be used to tunnel 1× registration message, SMS, and handoff direction message for VoIP. When the 1×MSC needs to page the wireless device, it can send the page request message through IWS, MME and E-UTRAN tunnel to the wireless device. After receiving the page request message, the wireless device will fall back to 1× network and continue the 1× circuit switching call. In addition to CSFB for MT call, the wireless device can fall back to CDMA2000 1× network for MO call.

A wireless communication system can provide interworking based on using a Generic Multiple Virtual Link Interworking Service (GMVL-IWS) Architecture. The GMVL-IWS) Architecture can provide a mechanism to encapsulate wireless network procotols.

Figure 2:
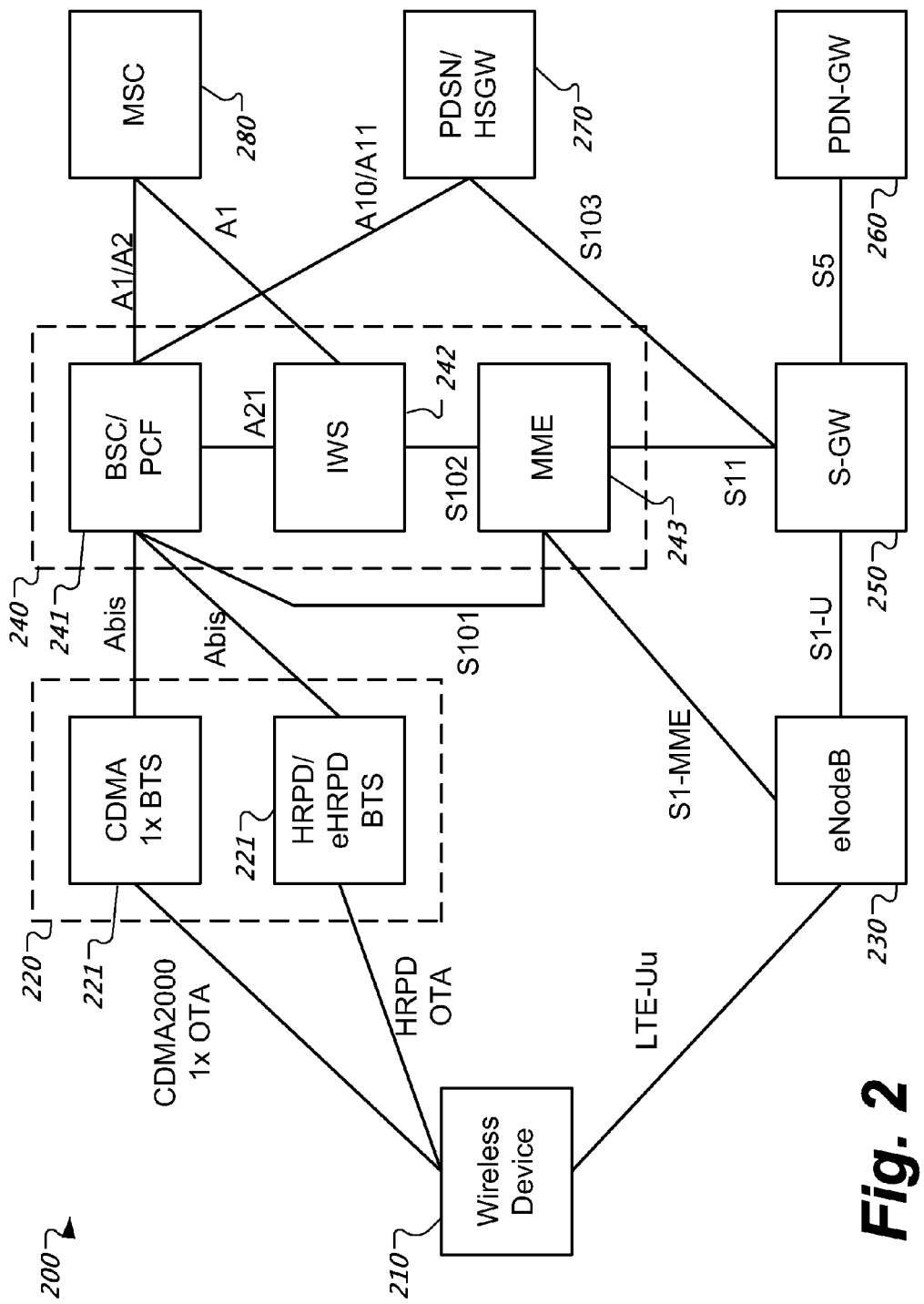
FIG. 2 shows an example of a Generic Multiple Virtual Link Interworking Service Architecture.

FIG. 2 shows an example of a Generic Multiple Virtual Link Interworking Service (GMVL-IWS) Architecture. A system 200 based on a GMVL-IWS Architecture can include one or more multi-mode wireless devices 210, a CDMA2000 base station 220, an eNodeB 230, a network control node 240, an IWS 242, a MME 243, a Serving Gateway (S-GW) 250, a Mobile Switching Center (MSC) 280, a PDSN/HRPD Serving Gateway (HSGW) 270, and a packet data network gateway (PDN-GW) 260.

Multi-mode wireless devices 210 can provide wireless connections to different wireless technology networks. A CDMA2000 base station 220 includes a CDMA2000 1× radio base transceiver station (BTS) 221 and a CDMA2000 HRPD radio base transceiver station (BTS) 222. The CDMA2000 base station 220 provides the voice and data services over the air connection to wireless device 210 using CDMA2000 1× technology and HRPD technology. The eNodeB 230 is a wireless base station in LTE network to provide the over the air (e.g., LTE-Uu) connection to the wireless device 210. In some implementations, circuitry for the CDMA2000 base station 220 is integrated with circuitry for the eNodeB 230. In some implementations, a radio control unit can implement multiple radio access technologies such as LTE and CDMA2000. In some implementations, a base station controller (BSC) can include a Policy Control Function (PCF).

The network control node 240 can include a BSC/PCF 241, an IWS 242, and a MME 243. The BSC/PCF 241 is a base station controller for control of the CDMA2000 base station 220 over an Abis interface. The MME 243 is a network entity used to control the eNodeB 230 over S1-MME interface. The IWS 242 is configured to support different wireless technologies interworking. The IWS 242 is connected to BSC/PCF 241 over an A21 interface. The IWS 242 is connected to the MME 243 over a S102 interface. The IWS 242 can tunnel CDMA2000 1× messages between a wireless device 210 and a MSC 280 over an A1 interface.

The S-GW 250 can provide packet routing function in a LTE network. The S-GW 250 can connect to the eNodeB 230 over a S1-U interface. The S-GW 250 can connect to the MME 243 over a S11 interface. A MSC 280 can provide mobile voice services in a circuit switching network. A serving gateway such as a PDSN/HSGW 270 is a serving gateway for a CDMA2000 radio access network connecting to a LTE core network. The PDSN/HSGW 270 can connect to a BSC/PCF 241 over an A10/A11 interface. The PDSN/HSGW 270 can connect to the S-GW 250 over a S103 interface. A PDN-GW 260 connects to the S-GW 250 over a S5 interface.

The multiple virtual link interworking services architecture provides a generic 1×CSFB framework across different wireless technologies. An IWS can provide a Virtual Link Interworking connection across one or more wireless technologies networks. The GMVL-IWS can support one or more logical channels, based on a first wireless technology, between a switching center such as a MSC 280 and a wireless device 210.

The multiple virtual link interworking service architecture supports different implementation and deployment options of interworking services.

Figure 3:
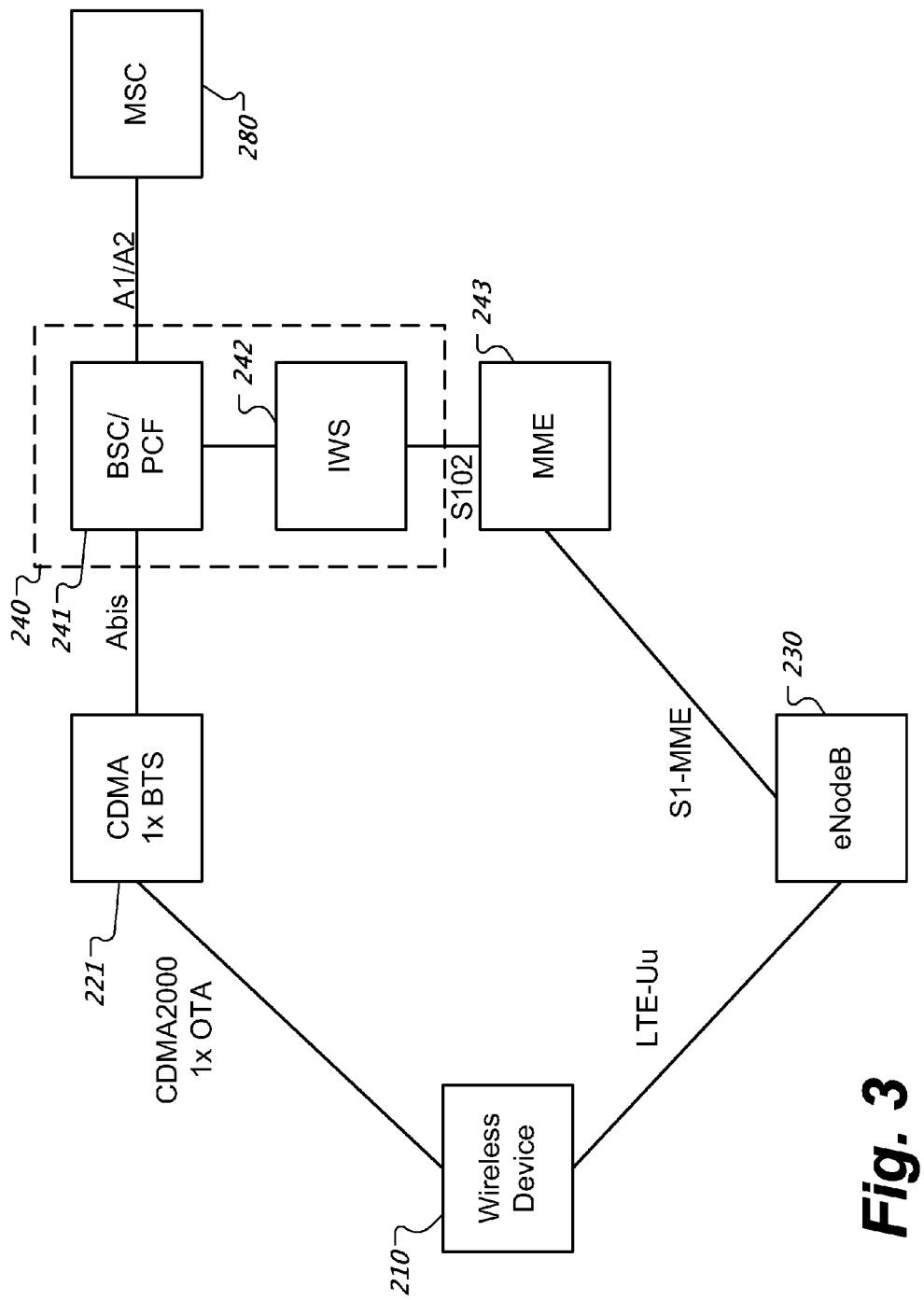
FIG. 3 shows an example of a multiple virtual link interworking service architecture for a 1× Circuit Switch Fall Back.

FIG. 3 shows an example of a multiple virtual link interworking service architecture for a 1×CSFB. This architecture can support wireless technology fallbacks such as an LTE to 1× fallback. In this example, IWS 242 is integrated into a BSC/PCF node 241. An integrated BSC and IWS can be referred to as a BSC-lite IWS. When IWS 242 is integrated into BSC 241, it could use an A1/A2 or A1p/A2p interfaces in the BSC to connect to the MSC 280 to tunnel the CDMA2000 1× messages between MSC 280 and wireless device 210. The A1 interface between the IWS 242 and the MSC 280 can be shared with the A1 interface between the BSC 241 and the MSC 280. In some implementations, the IWS 242 is a standalone node configured to provide 1×CSFB service.

Figure 4:
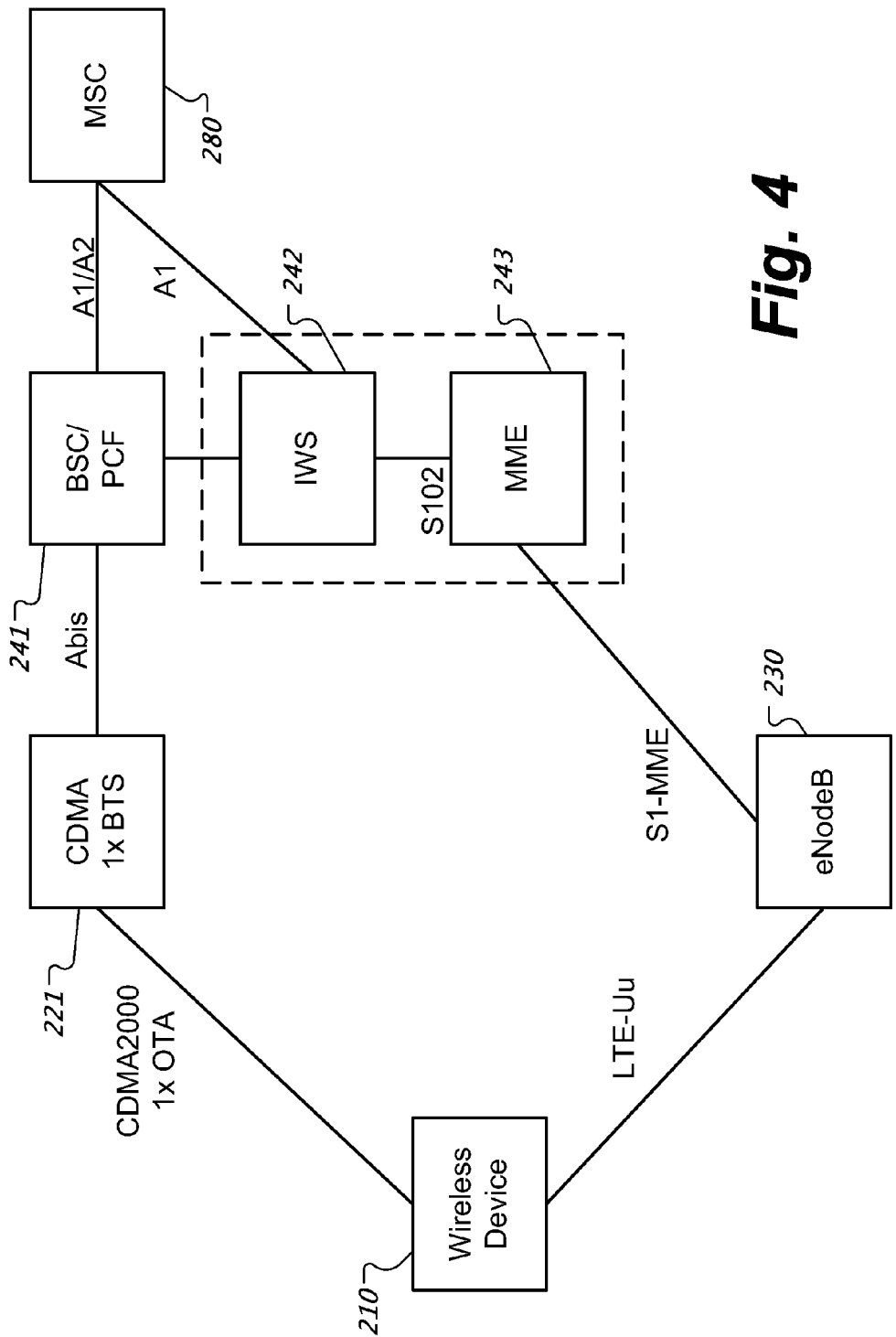
FIG. 4 shows another example of a multiple virtual link interworking service architecture for a 1× Circuit Switch Fall Back.

FIG. 4 shows another example of a multiple virtual link interworking service architecture for 1×CSFB. In this example, IWS 242 is integrated into the MME 243, and the interface 5102 is an internal interface between IWS 242 and MME 243. This architecture can support wireless technology fallbacks such as an LTE to 1× fallback.

Figure 5:
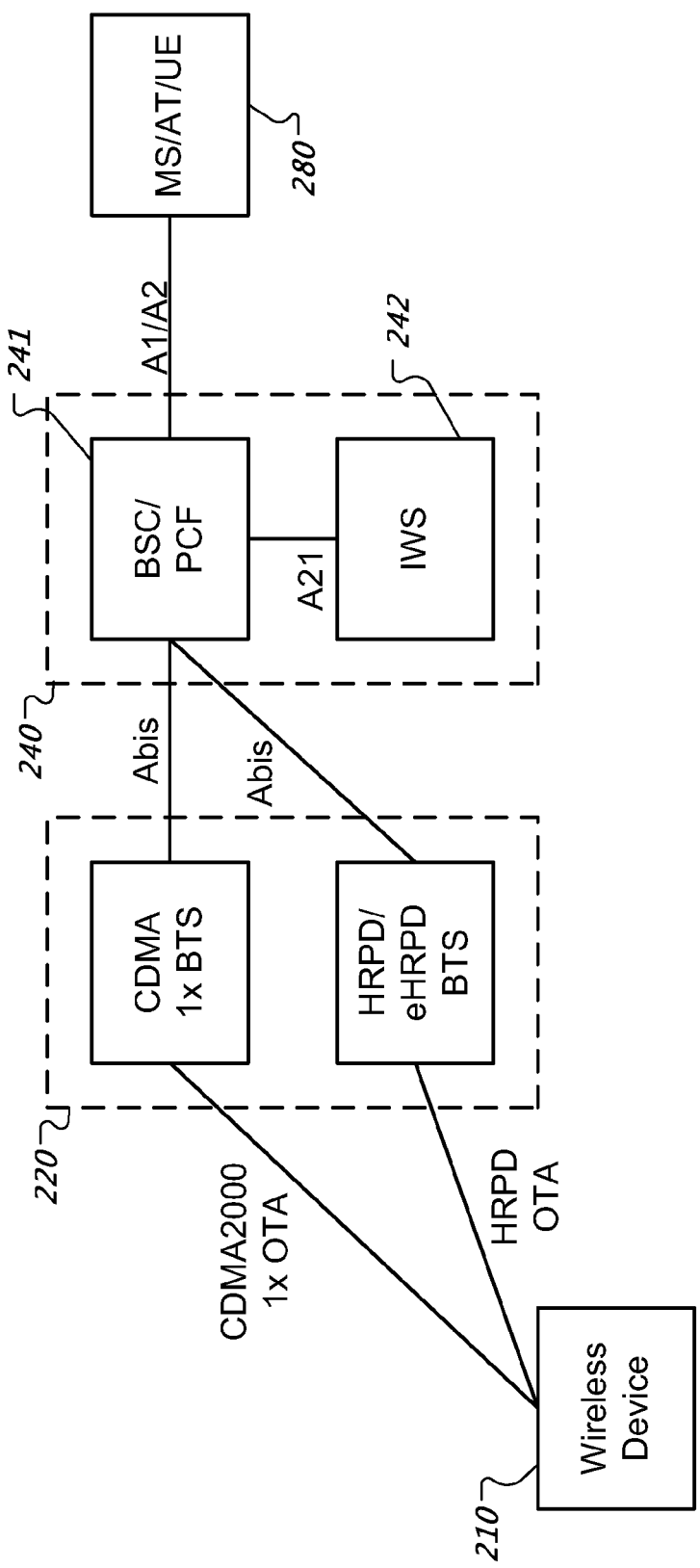
FIG. 5 shows an example of a multiple virtual interworking service architecture for a 1× Circuit Switch Fall Back from HRPD.

FIG. 5 shows an example of a multiple virtual interworking service architecture for 1×CSFB from HRPD. In this example, the A21 interface between the BSC 241 and IWS 242 is an internal interface. The IWS 242 can use an A1/A2 or A1p/A2p interfaces of BSC 241 to connect to the MSC 280 to tunnel CDMA2000 1× messages between the MSC 280 and wireless device 210. The A1 interface between the IWS 242 and the MSC 280 can be shared with the A1 interface between the BSC 241 and the MSC 280. This architecture can support wireless technology fallbacks such as an HRPD to 1× fallback.

In some implementations, the BSC, IWS and MME are integrated together into a single network node. Therefore, related interfaces such as A21 and S102 would become the internal interfaces of network node 240. IWS 242 can use the A1/A2 or A1p/A2p interfaces to tunnel CDMA2000 1× messages between the MSC 280 and the wireless device 210.

A multiple virtual link interworking can provide a 1× Signal Adaptation Protocol (SAP). A 1×SAP can provide a tunneling mechanism between a 1×MSC and wireless device.

Figure 6:
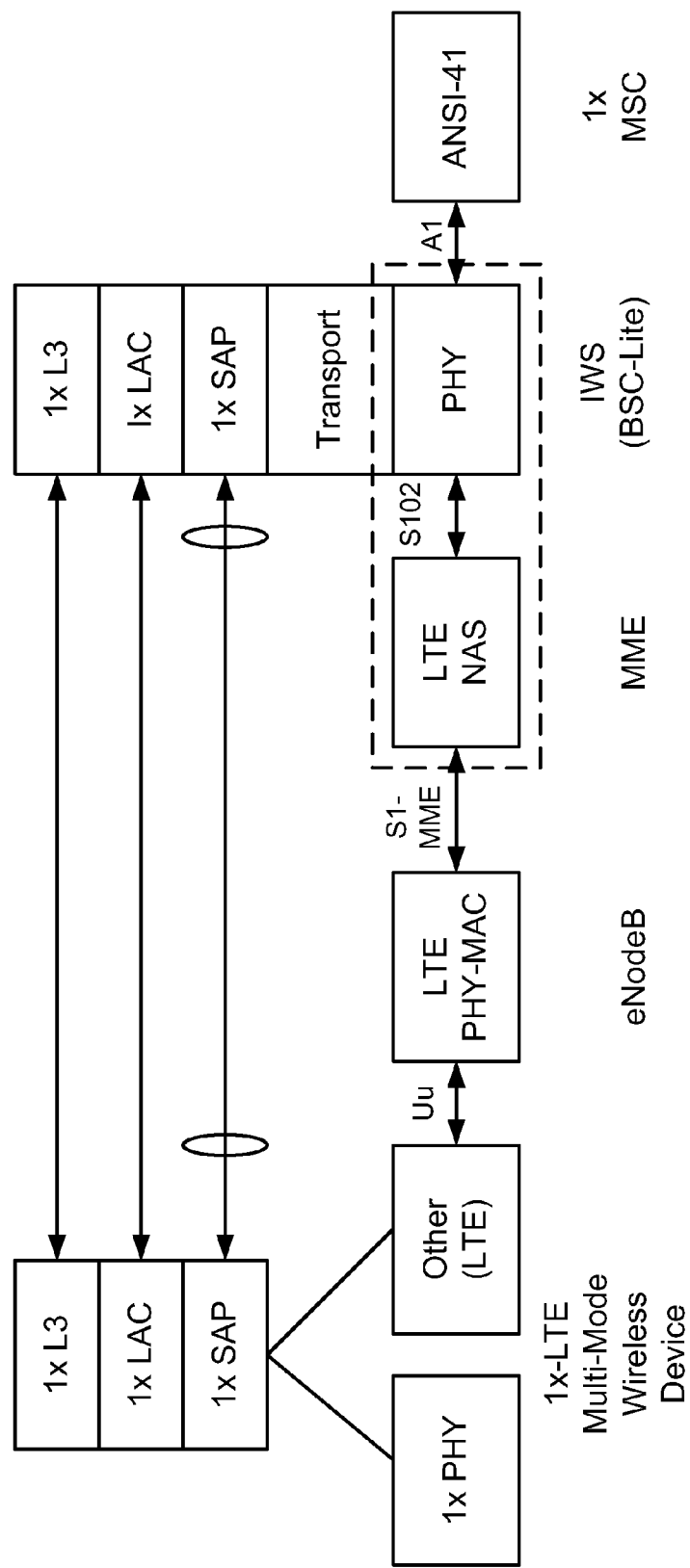
FIG. 6 shows an example of an interworking protocol stack for a multiple virtual link interworking architecture.
Figure 7:
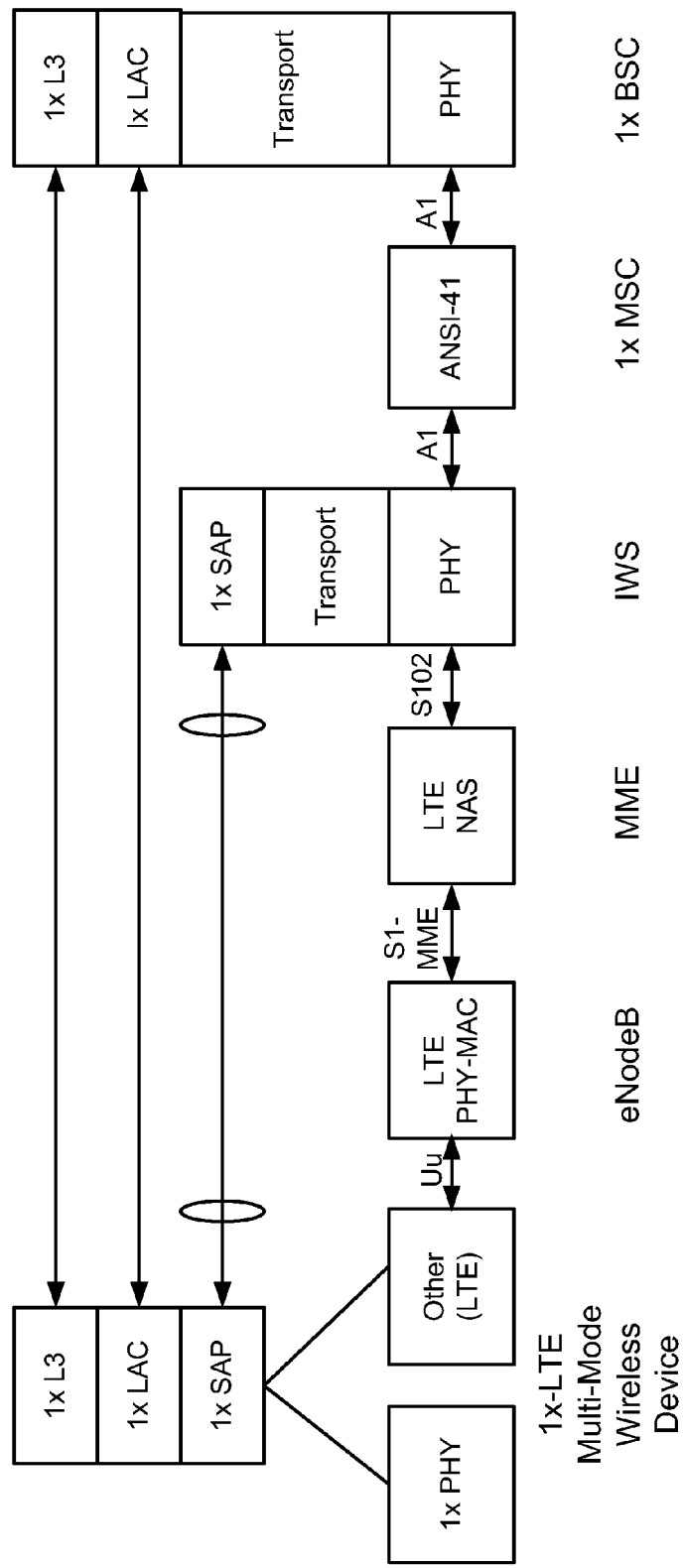
FIG. 7 shows another example of an interworking protocol stack for a multiple virtual link interworking architecture.
Figure 8:
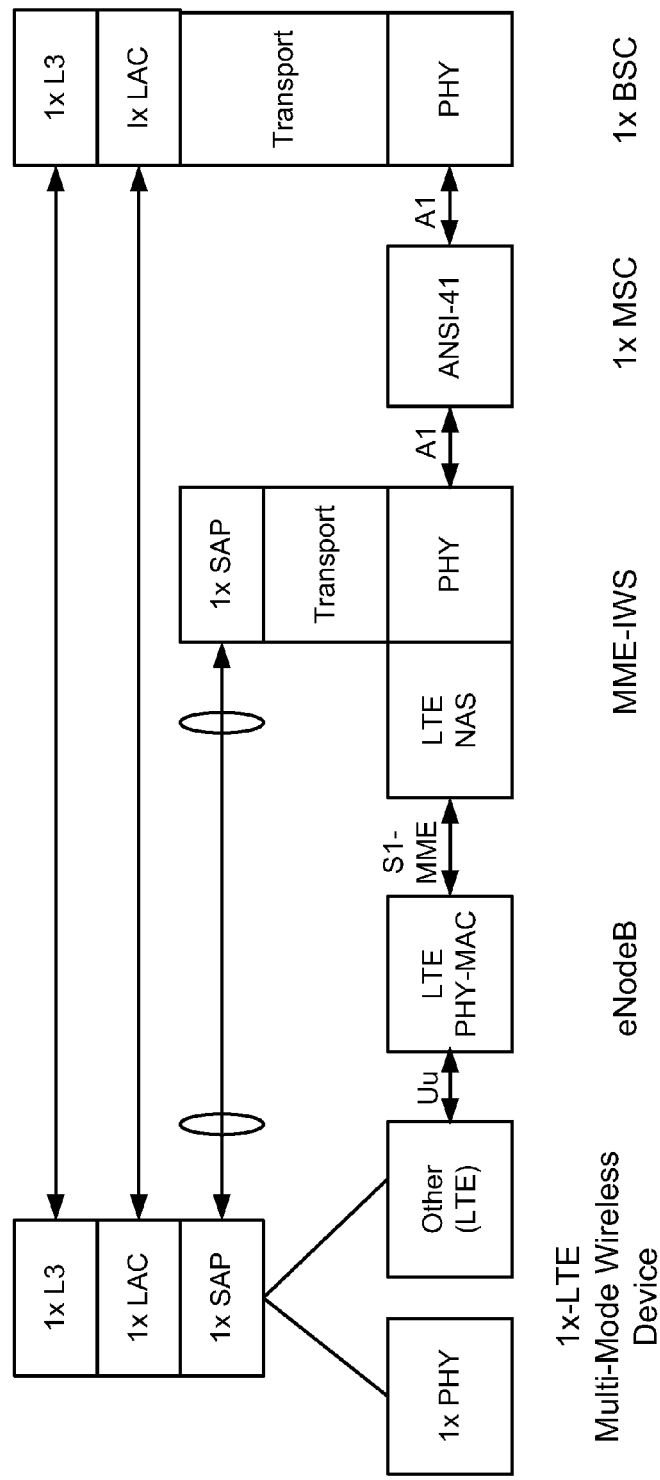
FIG. 8 shows an example of interworking protocol stack for an interworking architecture with an interworking service integrated with a mobility management entity.

FIG. 6 shows an example of interworking protocol stack for a BSC-Lite multiple virtual link interworking architecture. FIG. 7 shows an example of interworking protocol stack for a standalone multiple virtual link interworking architecture. FIG. 8 shows an example of interworking protocol stack for an interworking architecture with an IWS integrated with a MME.

An IWS can use an Interworking Protocol Stack to communicate with multi-mode wireless device. In some implementations, an Interworking Protocol Stack can include a generic 1× Signal Adaptation Protocol (1×SAP). The generic 1×SAP can provide a switch function between wireless technologies, and can encapsulate messages such as cdma2000 1× messages, e.g., registration, Short Message Service (SMS) and/or paging messages.

The generic 1×SAP can provide multiple virtual connections of 1× logical channels (f/r-csch or f/r-dsch) between a wireless device and BSC/MSC on a cdma2000 1× network. When the multi-mode wireless device 210 is connecting to LTE network, the generic 1×SAP on the wireless device 210 is used to provide a virtual connection through IWS 242 to MSC 280 over LTE network. When the multi-mode wireless device 210 is connecting to HRPD network, the generic 1×SAP on the wireless device 210 is used to provide a virtual connection through IWS 242 to MSC 280 over HRPD network. A logical channel field in the generic 1×SAP message can be used to associate the encapsulated message with a cdma2000 1× logical channel (f/r-csch or f/r-dsch) so as to form a virtual connection to the upper layer logical channel.

Figure 9:
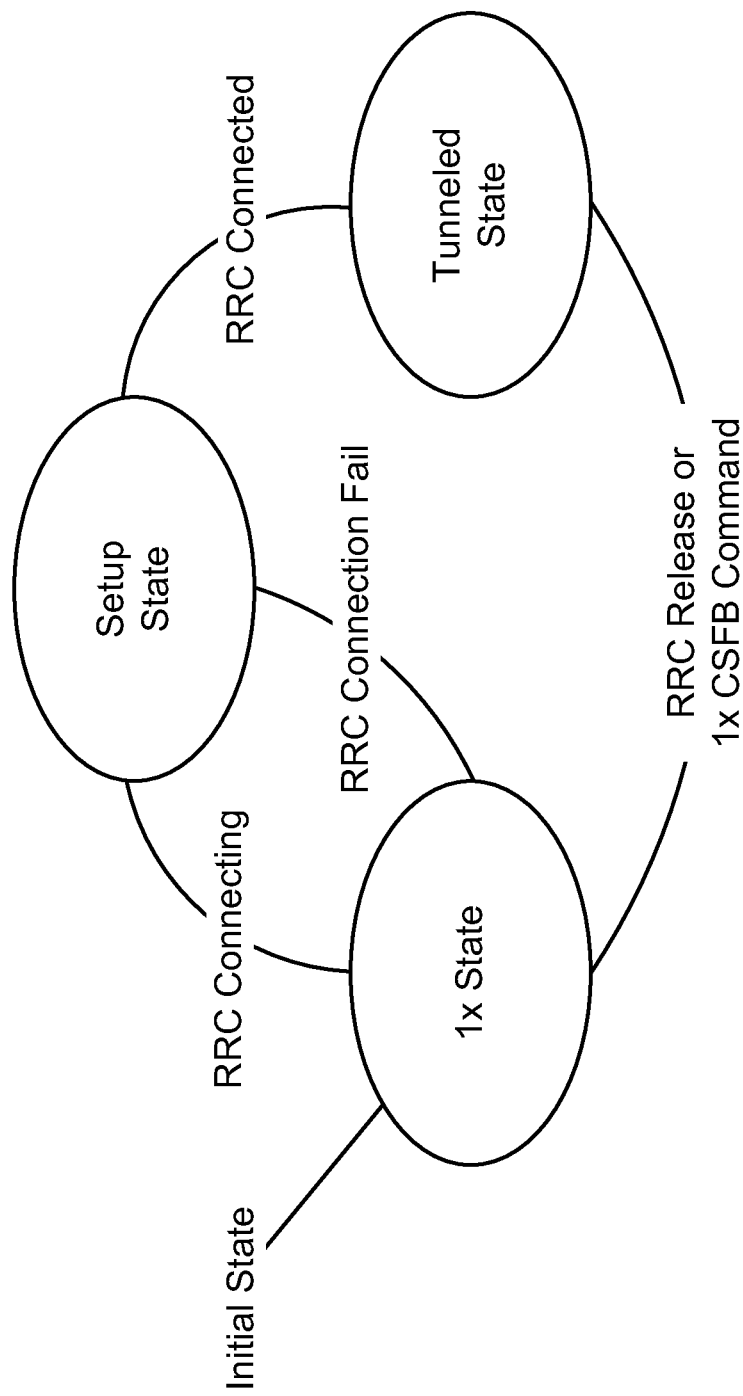
FIG. 9 shows an example of a 1× Signal Adaptation Protocol wireless device state transit diagram for Circuit Switch Fall Back from LTE.

FIG. 9 shows an example of a 1× Signal Adaptation Protocol wireless device state transit diagram for CSFB from LTE. At initialization, a 1×SAP mechanism enters the 1× State. In the 1× State, a radio module is tuned to a CDMA2000 1× frequency. In some implementations, a CDMA2000 1× upper layer signaling can go through the 1× connection directly. Based on a network searching priority configured in a RUIM/SIM card or neighbor technology information broadcast in CDMA2000 1× overhead message, the wireless device can attach a network. If a LTE network has a higher priority over a CDMA2000 network, then wireless device will start to search for a LTE network. Otherwise, the multi-mode wireless device can attach to a 1× network.

Assume the wireless device will attach to a LTE network. After leaving the 1× State, the single radio on the wireless device is tuned to a LTE frequency and the generic 1×SAP can enter the Setup State upon sending RRC (radio resource control) connection. If the RRC is connected, the generic 1×SAP can enter the Tunneled State in which the generic 1×SAP can tunnel the CDMA2000 1× messages over the LTE network. If RRC connection fails, the generic 1×SAP can go back from the Setup State to the 1× State. The generic 1×SAP can stay at the Tunneled State until RRC is released or 1×SAP receives 1×CSFB command and then go back to the 1× State.

If the wireless device does not find LTE signaling, the device can go back to attach to a 1× network. The device may periodically tune away from 1× to scan the LTE signals depending on the configuration of network selection.

Figure 10:
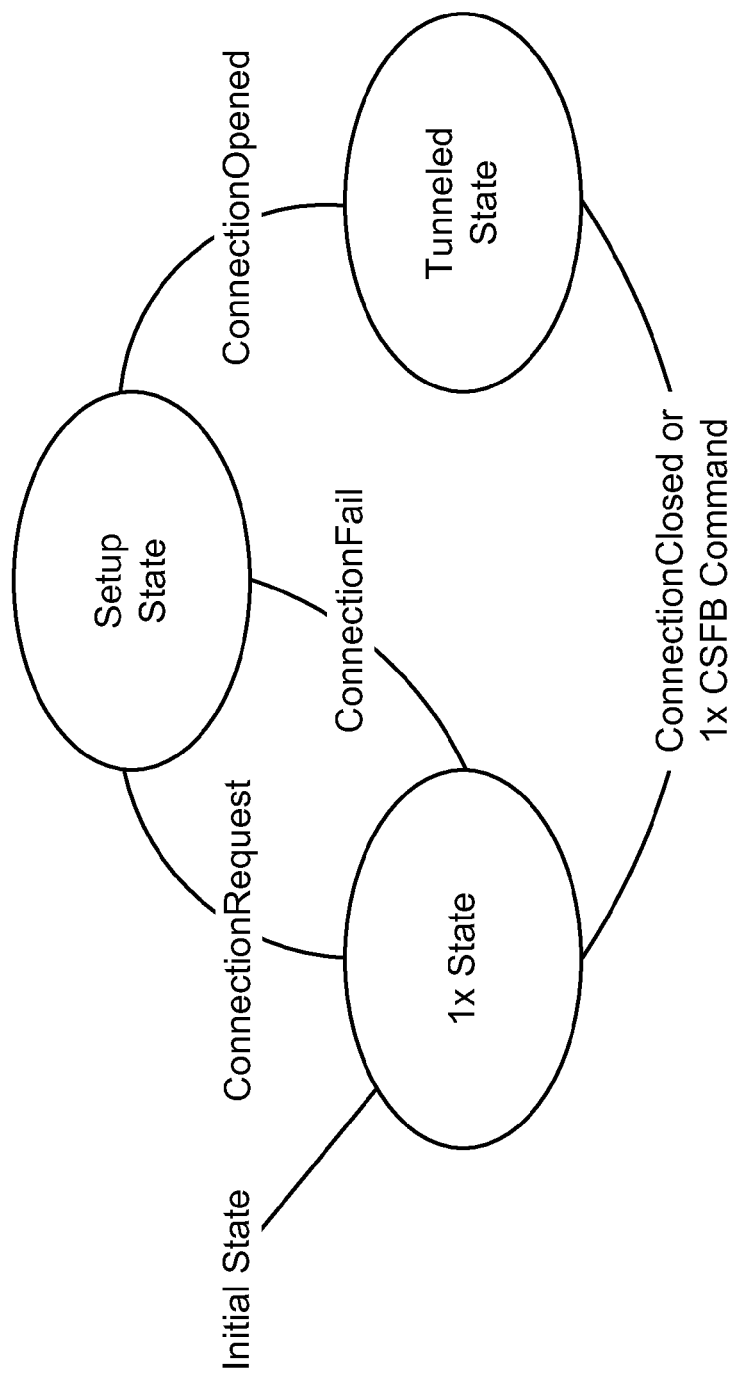
FIG. 10 shows an example of a 1× Signal Adaptation Protocol wireless device state transit diagram for Circuit Switch Fall Back from HRPD.

FIG. 10 shows an example of a 1× Signal Adaptation Protocol wireless device state transit diagram for CSFB from HRPD. At initialization, a 1×SAP mechanism enters the 1× State. If the wireless device is configured with a HRPD network having a higher priority, the wireless device can switch its radio to HRPD and the generic 1×SAP can enter Setup State when it decides to search for HRPD network and a ConnectionRequest message is sent. If the connection to HRPD is opened, the generic 1×SAP will enter Tunneled State and the wireless device can communicate the 1× messages over HRPD network. Otherwise, the generic 1×SAP will go back to 1× State. The generic 1×SAP will remain in Tunneled State until the HRPD connection is closed, and then go back to 1× State.

The multi-mode wireless device can use the generic 1×SAP states to determine the radio connection to either CDMA2000 1× or LTE or HRPD. When the generic 1×SAP is in 1× State, the radio is tuned to 1× frequency. When the generic 1×SAP is in other States, the radio can connect to either the LTE or HRPD network based on the configuration of the network selection and network availability. If the network selection priority order configured in RUIM/SIM or broadcast in overhead system parameters is LTE, HRPD and 1×, the wireless device can try to attach to LTE first. If attaching to LTE network succeeds, the wireless device can stay in connection to LTE until the connection is released or CSFB to 1× network.

GMVL-IWS can provide mechanisms for cdam2000 1× fallback from different technology networks. In some implementations, GMVL-IWS can comply with 3GPP LTE and cdma2000 1×CSFB architectures. A 1×-SAP mechanism can be used to carry 1× related information over different technologies to support LTE or WiMAX 1×CSFB. GMVL-IWS can provide flexible implementation options.

FIG. 11 shows an example of a 1×SAP 1× Transfer message. A 1×SAP 1× transfer message can be used to encapsulate CDMA2000 1× messages. In a 1× Transfer message, a message ID is used to identify the 1× transfer message. The 1×SAP, as disclosed herein, can support duplicated message detection and acknowledgement (ACK) based retransmission. The MessageSequence and ACKRequired fields are used for the duplicated message detection and retransmission. If the duplicated message detection and retransmission is required, the sender sets ACKRequired field to "1" and MessageSequence field to one more than the MessageSequence field of the last message requiring acknowledgement sent by the sender. The 1× logical channel field is used to indicate the encapsulated 1× message to be carried over the logical channel in native CDMA2000 1× network. The wireless device, acting as the sender, sets this field to "0" if the encapsulated 1× signaling is transmitted over a virtual r-csch; or sets to "1" if transmitted over virtual r-dsch. An IWS, acting as the sender, can set this field to "0" if the encapsulated signaling is transmitted over virtual f-csch; or set to "1" if transmitted over virtual f-dsch. The 1× SignalingLength and 1× Signaling fields defines a container to carry 1× signaling. The 1× Signaling field can include a CDMA2000 1× signaling packet data unit (PDU) which length is set by a 1× SignalingLength field.

There are multiple options to carry CDMA2000 1× messages using a 1×SAP as described herein. Option One is to specify the generic 1×SAP can only carry a set of 1× messages used for 1× registration, SMS, MO and MT call. Option Two is not to limit any 1× message carried by the generic 1×SAP. If Option One is used, the 1×SAP is required to perform a special filtering function for each message transmitting over the logical channels. If the message is not defined in the generic 1×SAP encapsulation list, the generic 1×SAP can send a 1× Transfer Reject message.

Communications based on 1×SAP can include a 1× transfer acknowledgement message, a 1× transfer reject message, and a 1×CSFB message.

FIG. 12 shows an example of 1× transfer acknowledgement message. If the duplicated message detection and retransmission is required, the receiver can send the 1× Transfer Ack message to the sender.

FIG. 13 shows an example of 1× transfer reject message. If the 1×SAP does not support of transferring 1× message, the receiver can send 1× Transfer Reject message to the sender.

FIG. 14 shows an example of 1×CSFB message. A 1×CSFB message is used by IWS to indicate wireless device to switch back to CDMA2000 1× network at the last signaling exchange over a tunnel.

A wireless communication system can provide a mechanism for 1×CSFB registration. In some implementations, a wireless device is required to register with the CDMA2000 1× network so that the 1×MSC is able to page the wireless device when it is attaching to a LTE network. When a wireless device is registered with a MSC through an IWS, the MSC can treat the IWS as a network node similar to a BSC. When a circuit switch call is coming for the wireless device, the MSC can send a page request to the IWS which the wireless device is registered through.

The 1× registration process is triggered when the wireless device detects the registration zone change or band class information change. The registration zone information and band class information could be broadcast in SIB-8 message of eNodeB or unicast in CDMA2000 1× System Parameters from IWS through eNodeB. When the wireless device is attaching to a LTE network, and moves into a different IWS from a previous one which the 1× registration is sent through, the wireless device is required to register again. If the wireless device falling back to 1× network for 1× circuit switch services returns to LTE network, the wireless device is required to register with 1×MSC again. To trigger the 1× registration, the native CDMA2000 1× network and the CDMA2000 system parameters unicast from IWS through eNodeB could be configured in different registration zones or different band classes.

Figure 15:
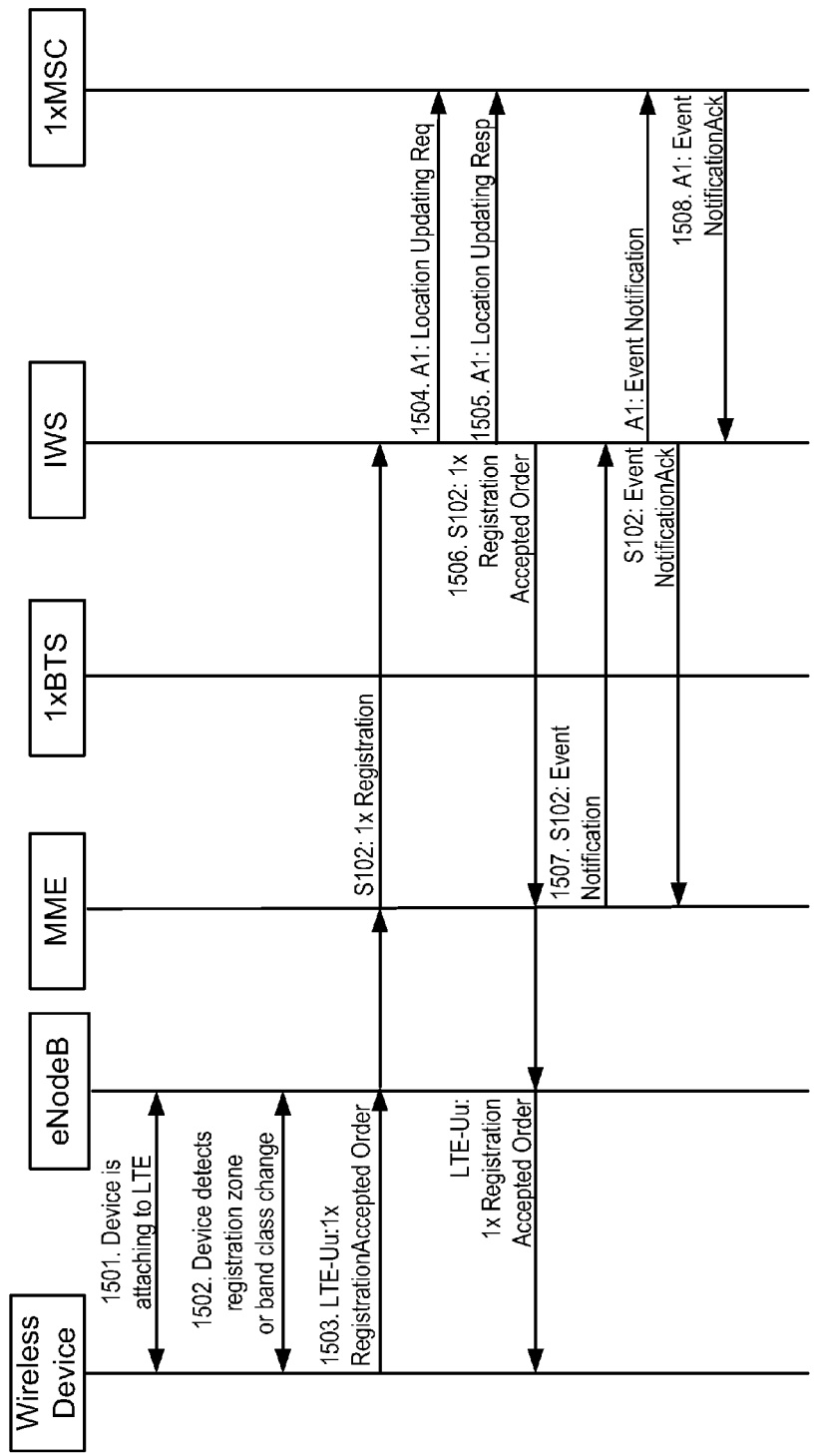
FIG. 15 shows an example of a 1× Circuit Switch Fall Back registration call flow.

FIG. 15 shows an example of a 1×CSFB registration call flow. At 1501, a wireless device is attaching to a LTE network in Active State. At 1502, the wireless device detects the registration zone or band class change. At 1503, the wireless device sends an encapsulated 1× registration to the IWS over a LTE tunnel through an eNodeB and MME. At 1504, the IWS sends a Location Update Request to MSC/VLR At 1505, the MSC/VLR responds with a Location Update response to the IWS. At 1506, the IWS can keep the location information for the wireless device and send a Registration Accept Order to the wireless device over a LTE tunnel. At 1507, the MME can send an Event Notification to the IWS and forward to the MSC once the wireless device changes its connection status in LTE. The MSC can use this information to track the wireless device. At 1508, the MSC sends an acknowledgement to the Event Notification.

Figure 16:
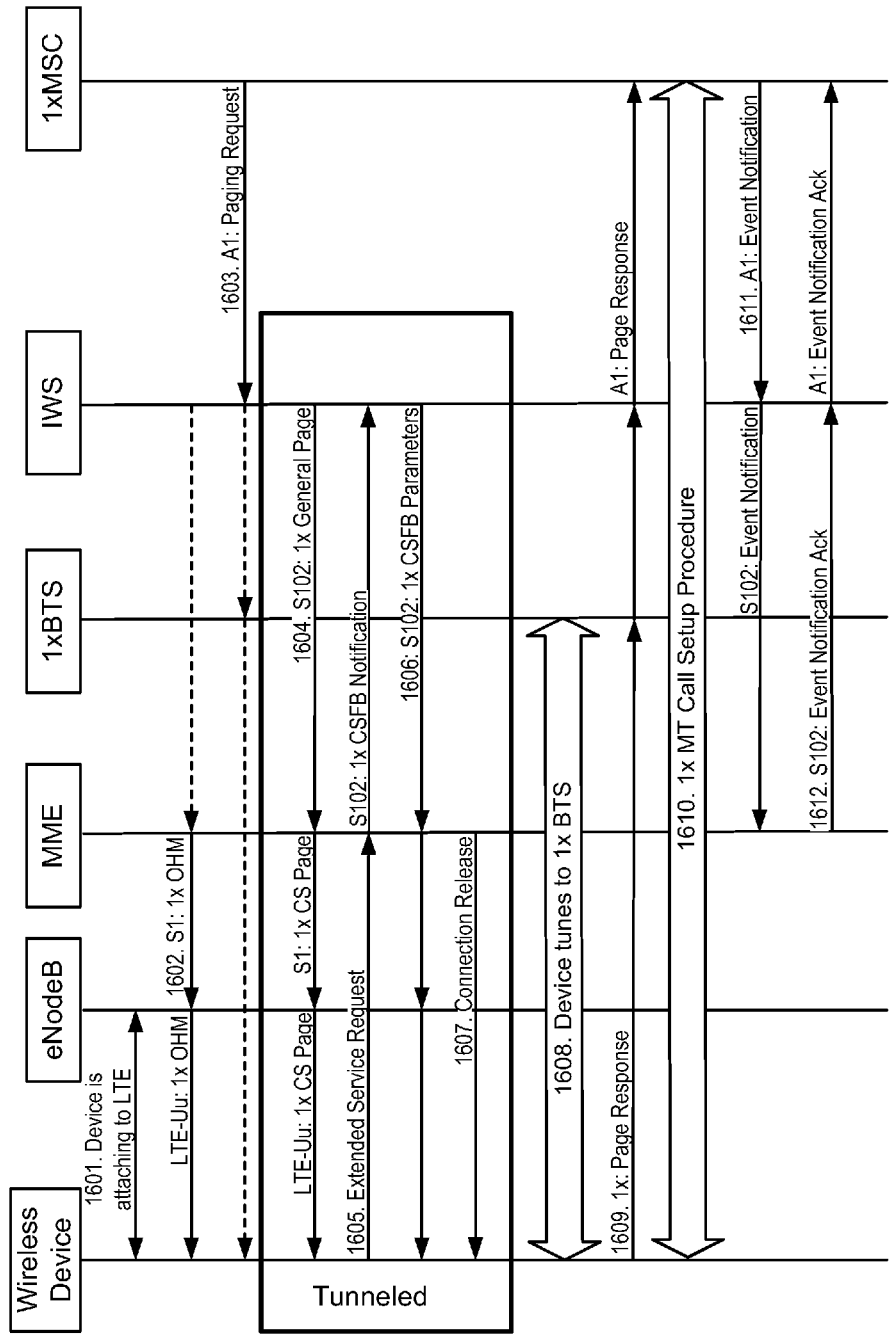
FIG. 16 shows an example of a 1× Circuit Switch Fall Back call flow for a mobile terminated call.

FIG. 16 shows an example of a 1×CSFB call flow for a mobile terminated call. A wireless device has completed registration with a CDMA2000 1× network, At 1601, the wireless device is attaching to a LTE network. At 1602, the MME broadcasts 1× System Parameters in SIB-8. The wireless device receives and stores the parameters. At 1603, based on a tracking record, 1×MSC knows that the wireless device is attaching to the LTE network and sends a Page Request message to IWS. At 1604, the IWS sends the 1× circuit switch page through a LTE tunnel via MME and eNodeB to the wireless device. The IWS can send a 1× circuit switch page through 1× BTS for the case that the wireless device is in LTE-Idle. At 1605, the wireless device sends an Extended Service Request message to the MME to indicate to switch back to CDMA2000 1× network. The MME can send a 1×CSFB Notification to the IWS. At 1606, the IWS can send 1×CSFB parameters through the eNodeB to the wireless device to assist the wireless device to acquire the CDMA2000 1× signal. At 1607, the MME releases and redirects the wireless device to the CDMA2000 1× network. At 1608, the wireless device can use the stored 1× system information to tune its radio to a 1× frequency. At 1609, the wireless device sends the a 1× Page Response to the IWS through the 1×BTS. At 1610, the wireless device and 1×BTS performs a 1× mobile terminal call setup procedure. At 1611, the 1×MSC sends an Event Notification to notify the MME through the IWS that the wireless device is connecting to the 1× network. At 1612, the MME sends an acknowledgement based on the Event Notification.

Figure 17:
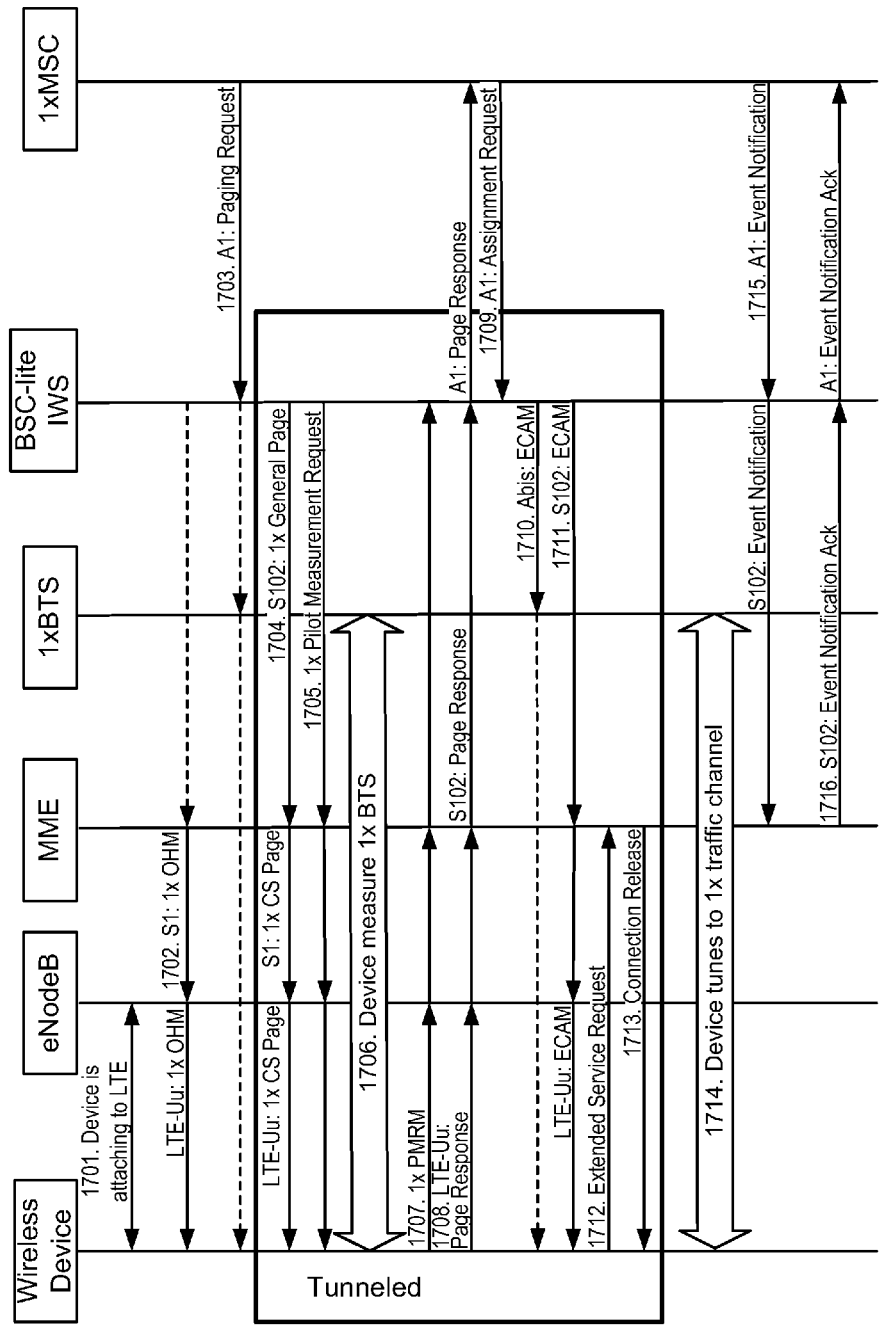
FIG. 17 shows another example of a 1× Circuit Switch Fall Back call flow for a mobile terminated call.

FIG. 17 shows another example of a 1×CSFB call flow for a mobile terminated call. This example uses a BSC-Lite IWS. In this example, the 1×CSFB call flow is optimized by tunneling Page Response and Extended Traffic Channel Assignment message over a LTE network to reduce the mobile terminated call setup time. At 1701, a wireless device completed registration with a 1× network and is attaching to a LTE network. At 1702, the MME broadcasts 1× system parameters in SIB-8. The wireless device receives and stores the 1× system parameters. At 1703, the 1×MSC sends a Page Request to the IWS.

At 1704, the IWS sends the 1× circuit switch Page through a LTE tunnel via the MME and the eNodeB to the wireless device. The IWS can send a 1× circuit switch page through the 1×BTS for the case that the wireless device is in a LTE-Idle state. At 1705, the IWS can send a Pilot Measurement Request to the wireless device over the tunnel. At 1706, the wireless device measures a 1×BTS pilot signal in a measurement gap. At 1707, the wireless device reports measurement result in a Power Measurement Report Message (PMRM) to the IWS over the LTE tunnel. At 1708, the wireless device sends a 1× Page Response message to the IWS over the LTE tunnel and to the MSC.

At 1709, the MSC sends an Assignment Request to the IWS. At 1710, the IWS sends an extended channel assignment message (ECAM) to the 1×BTS. Based on the ECAM, the 1×BTS allocates a radio resource to sets up a traffic channel on the BTS side to reduce the call setup time. At 1711, the IWS sends an ECAM to the wireless device over the tunnel to request to setup a traffic channel. In some implementations, the IWS sends a 1×CSFB Command to trigger 1×SAP switch over. In some implementations, the wireless device automatically triggers the switch over by itself. Based on receiving the ECAM, at 1712, the wireless device sends an Extended Service Request message to the MME to indicate to switch to the CDMA2000 1× network. At 1713, the MME releases the connection and sends a connection release message to the wireless device.

At 1714, the wireless device switches to 1× traffic channel which is allocated by the 1×BTS. At 1715, the 1×MSC notifies the MME through the IWS that the wireless device is connecting to 1× network. At 1716, the MME acknowledges the notification to the MSC over a S102 interface.

Figure 18:
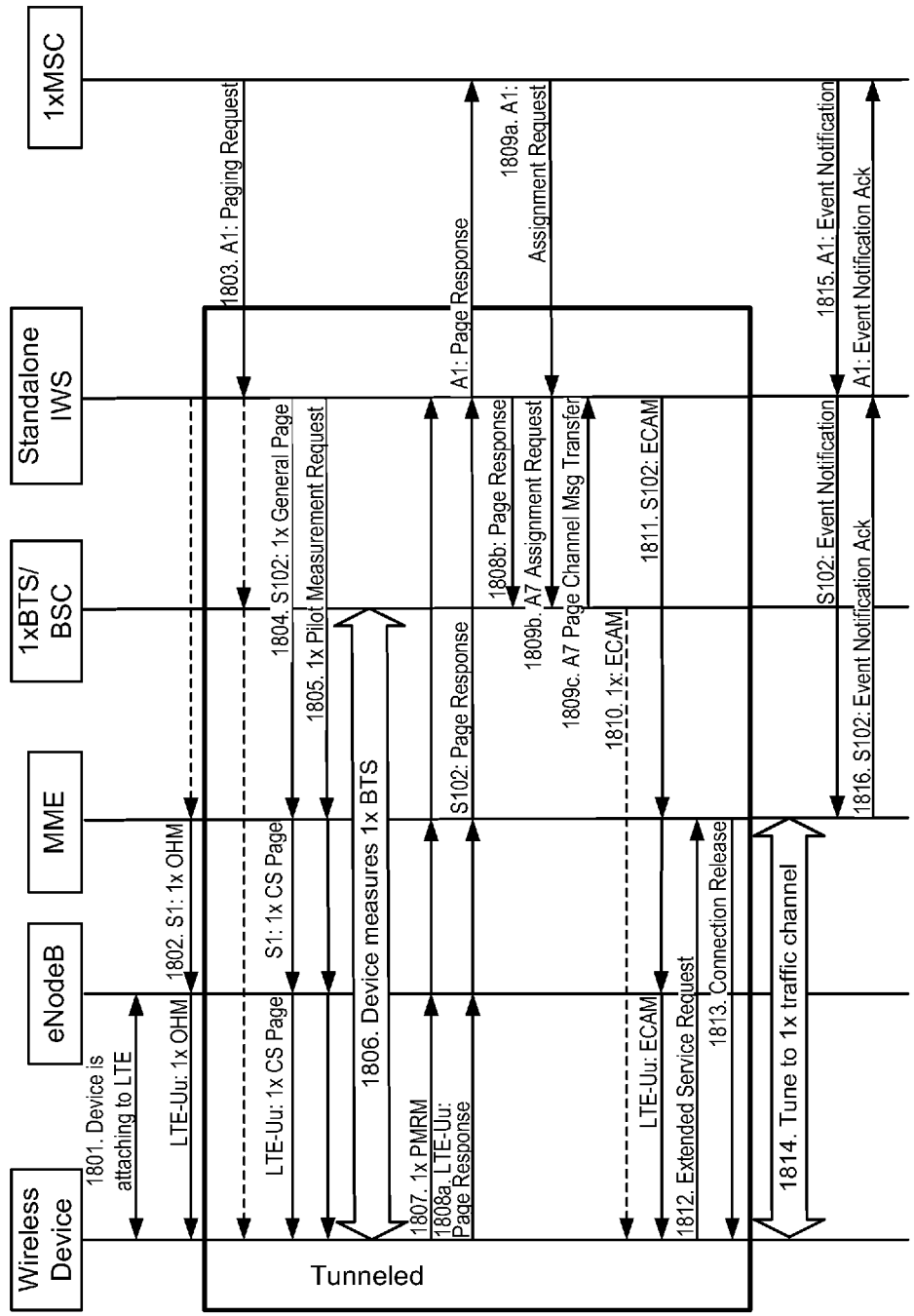
FIG. 18 shows another example of a 1× Circuit Switch Fall Back call flow for a mobile terminated call.

FIG. 18 shows another example of a 1×CSFB call flow for a mobile terminated call. This example uses a standalone IWS. At 1801, a wireless device completed registration with a 1× network and is attaching to a LTE network. At 1802, the MME broadcasts 1× system parameters in SIB-8. The wireless device receives and stores the 1× system parameters. At 1803, the 1×MSC sends a Page Request to the IWS.

At 1804, the IWS sends the 1× circuit switch Page through a LTE tunnel via the MME and the eNodeB to the wireless device. The IWS can send a 1× circuit switch page through the 1×BTS for the case that the wireless device is in a LTE-Idle state. At 1805, the IWS can send a Pilot Measurement Request to the wireless device over the tunnel. At 1806, the wireless device measures 1×BTS pilot signal in Measurement Gap. At 1807, the wireless device reports measurement result in a PMRM to the IWS over the LTE tunnel. At 1808*a*, the wireless device sends a 1× page response message to the IWS over the LTE tunnel and to the MSC.

At 1808*b*, the IWS can send a page response message to the 1×BTS/BSC. In some implementations, at 1808*b*, the IWS sends a message that includes the PMRM information. At 1809*a*, the MSC sends an Assignment Request to the IWS. At 1809*b*, the IWS can forward the Assignment Request to the 1×BTS. At 1809*c*, the 1×BTS/BSC can send an A7-Paging Channel Transfer Message to the IWS. In some implementations, the BSC constructs an ECAM and sends the ECAM over an A7-Paging Channel Transfer Message to the IWS. At 1810, the BSC sends an ECAM to the 1×BTS to allocate radio resource for a traffic channel on the BTS side to reduce the call setup time. At 1811, the IWS sends an ECAM to the wireless device over the tunnel to request to setup a traffic channel. In some implementations, the IWS sends a 1×CSFB Command to trigger 1×SAP switch over. In some implementations, the wireless device automatically triggers the switch over by itself. Based on receiving the ECAM, at 1812, the wireless device sends an Extended Service Request message to the MME to indicate to switch to the CDMA2000 1× network. At 1813, the MME releases the connection and sends a connection release message to the wireless device.

At 1814, the wireless device switches to 1× traffic channel which is allocated by the 1×BTS. At 1815, the 1×MSC notifies the MME through the IWS that the wireless device is connecting to 1× network. At 1816, the MME acknowledges the notification to the MSC over a S102 interface.

Figure 19:
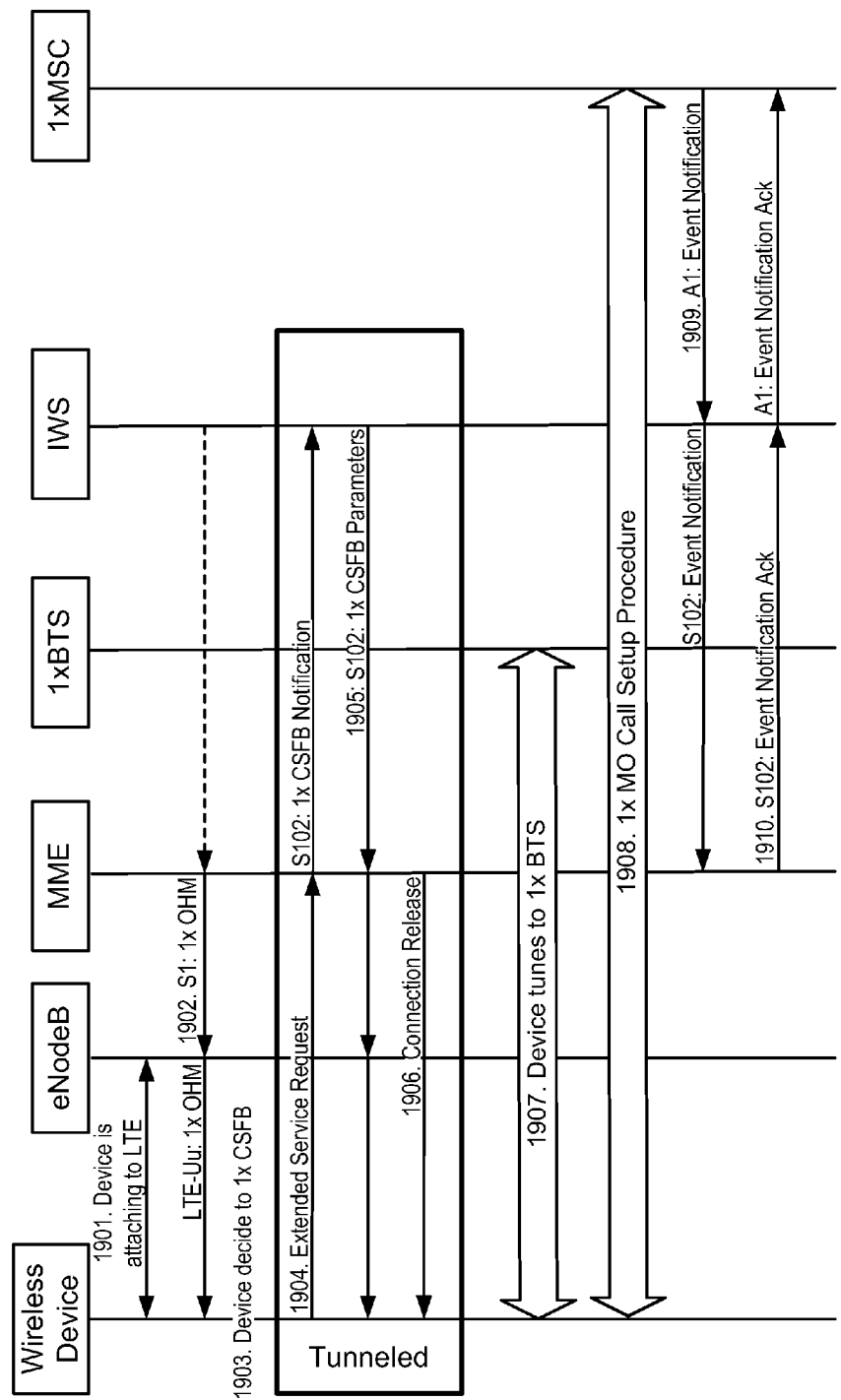
FIG. 19 shows another example of a 1× Circuit Switch Fall Back mobile originated call flow.

FIG. 19 shows another example of a 1×CSFB mobile originated call flow. This example is associated with a BSC-Lite IWS implementation. At 1901, a wireless device has completed registration with 1× network and is attaching to LTE network. At 1902, the MME broadcasts 1× System Parameters in SIB8. The wireless device receives and stores them. At 1903, the wireless device decides to make 1×CSFB for origination. At 1904, the wireless device sends an Extended Service Request message to MME to indicate to switch back to cdma2000 1× network. The MME can send a notification to the IWS. At 1905, the IWS can send 1×CSFB parameters, via the eNodeB, to the wireless device over the tunnel to assist the wireless device to acquire a 1× signal. At 1906, the MME releases and redirects the wireless device to CDMA2000 1× network. At 1907, the wireless device uses the stored 1× system information to tune its radio to 1× frequency. At 1908, the wireless device and 1×BTS perform a mobile originated call procedure to setup a traffic channel. At 1909, the 1×MSC notifies MME through IWS that the wireless device is connecting to CDMA2000 1× network. At 1910, the MME acknowledges the notification.

Figure 20:
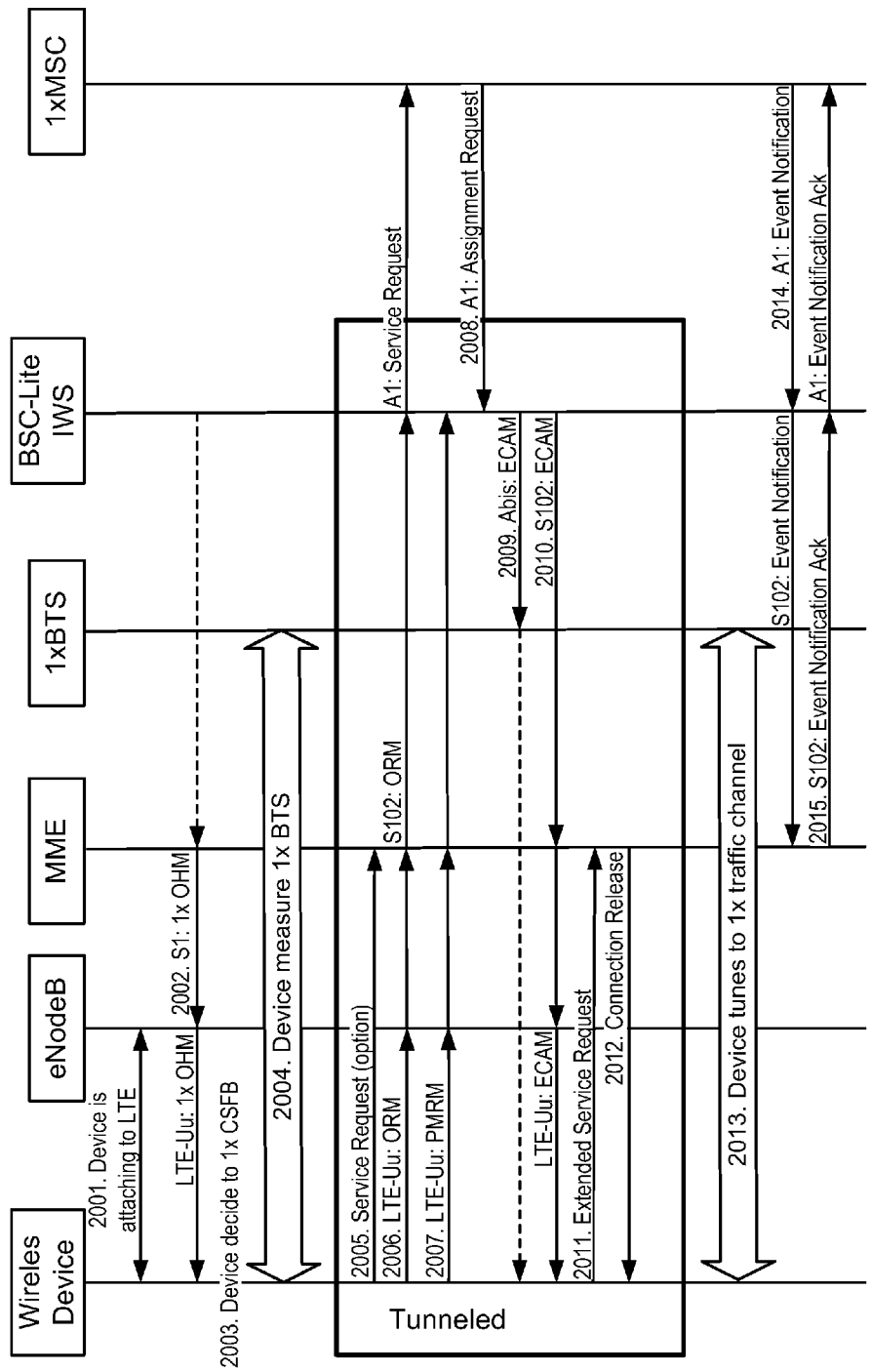
FIG. 20 shows another example of a 1× Circuit Switch Fall Back mobile originated call flow.

FIG. 20 shows another example of a 1×CSFB mobile originated call flow. This example is associated with a BSC-Lite IWS. This call flow optimizes 1×CSFB mobile originated calls via tunneling some 1× messages over LTE to reduce the call setup latency. At 2001, a wireless device has completed registration with 1× network and is attaching to LTE network.

At 2002, the MME broadcasts 1× System Parameters in SIB8. The wireless device receives and stores the system parameters. At 2003, the wireless device decides to CSFB to CDMA2000 1× network for MO call or sends a SMS over 1× traffic channel. At 2004, the wireless device measures a 1×BS pilot signal in a measurement gap.

At 2005, the wireless device can send a Service Request if it is in the Idle State. At 2006, the wireless device sends the 1× Origination Request Message (ORM) to the IWS over the tunnel and to the MSC. At 2007, the wireless device reports measurement results in a PMRM to the IWS over the tunnel. At 2008, the MSC sends an Assignment Request to IWS. At 2009, the IWS sends an ECAM message to 1×BTS to allocate radio resource and setup traffic channel on BTS side for optimization of call setup time. At 2010, the IWS sends an ECAM to the wireless device over the tunnel to request to setup a traffic channel. In some implementations, the IWS sends a 1×CSFB Command to trigger 1×SAP switch over. In some implementations, the wireless device automatically determine the switch over by itself. At 2011, based on receiving an ECAM message, the wireless device sends an Extended Service Request message to the MME to indicate a switch to the CDMA2000 1× network. At 2012, the MME sends a connection release message to release the connection.

At 2013, the wireless device switches to a 1× traffic channel. At 2014, the 1×MSC notifies the MME through IWS that the wireless device is connecting to CDMA2000 1× network. At 2015, the MME acknowledges the notification.

Figure 21:
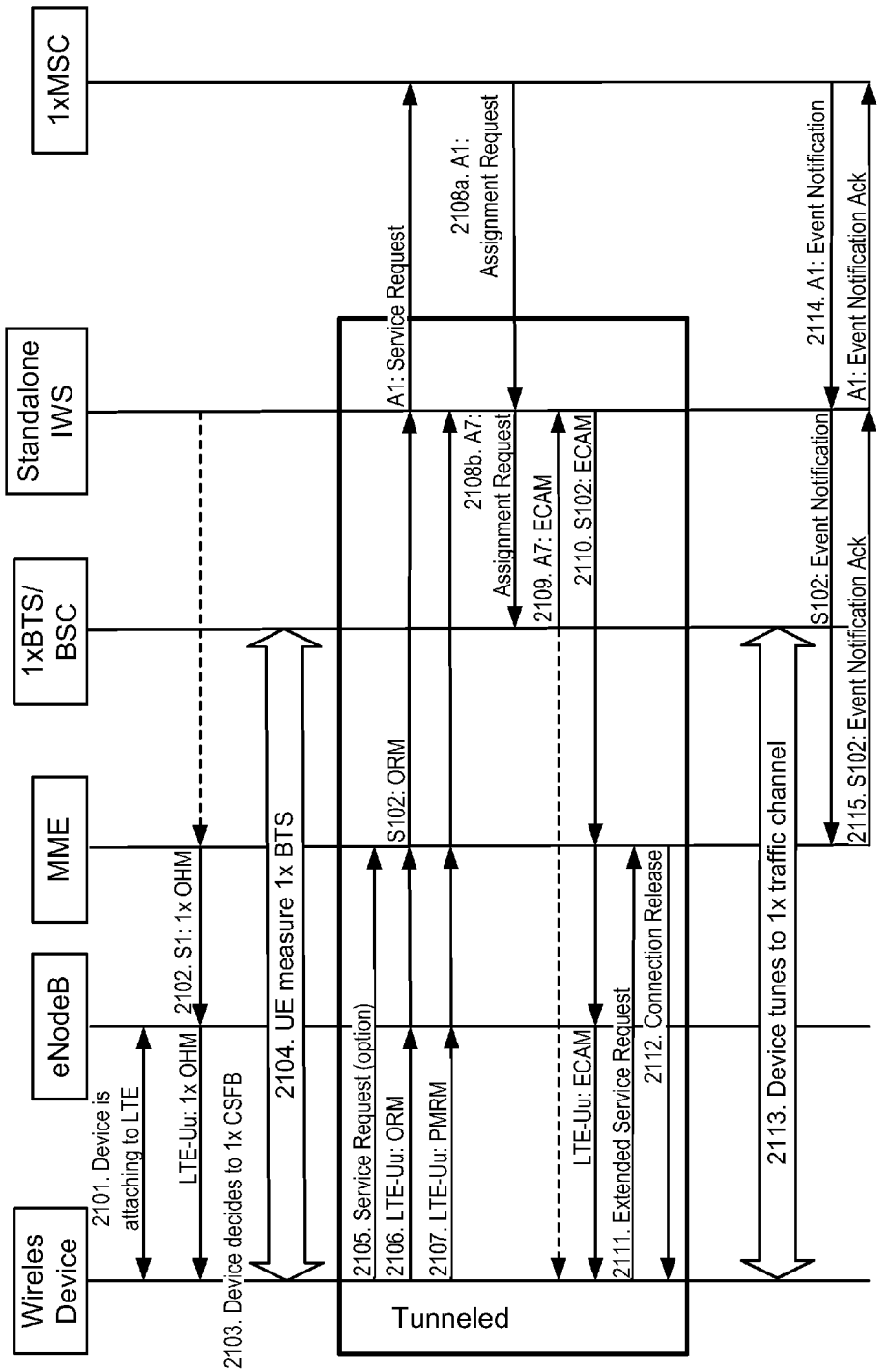
FIG. 21 shows an example of a 1× Circuit Switch Fall Back mobile originated call flow.

FIG. 21 shows an example of a 1×CSFB mobile originated call flow. This example is associated with a standalone IWS. This call flow optimizes 1×CSFB mobile originated calls via tunneling some 1× messages over LTE to reduce the call setup latency. At 2101, a wireless device has completed registration with 1× network and is attaching to LTE network. At 2102, the MME broadcasts 1× System Parameters in SIB8. The wireless device receives and stores the system parameters. At 2103, the wireless device decides to CSFB to CDMA2000 1× network for MO call or sends a SMS over 1× traffic channel. At 2104, the wireless device measures a 1×BS pilot signal in a measurement gap.

At 2105, the wireless device can send a Service Request if it is in the Idle State. At 2106, the wireless device sends the 1× Origination Request Message (ORM) to the IWS over the tunnel and to the MSC. At 2107, the wireless device reports measurement results in a PMRM to the IWS over the tunnel. At 2108a, the MSC sends an assignment request to the IWS. At 2108b, the IWS can forward the assignment request to the 1×BSC.

At 2109, based on the assignment request the 1×BSC constructs an ECAM and sends the ECAM to the IWS over an A7 interface. The 1×BSC/BTS can setup traffic channel on BTS side. At 2110, based on receiving the ECAM, the IWS can forward the ECAM to the wireless device over the tunnel to request to setup a traffic channel. In some implementations, the IWS sends a 1×CSFB Command to trigger 1×SAP switch over. In some implementations, the wireless device automatically determine the switch over by itself.

At 2111, based on receiving an ECAM message, the wireless device sends an Extended Service Request message to the MME to indicate a switch to the CDMA2000 1× network. At 2112, the MME sends a connection release message to release the connection.

At 2113, the wireless device switches to a 1× traffic channel. At 2114, the 1×MSC notifies the MME through IWS that the wireless device is connecting to CDMA2000 1× network. At 2115, the MME acknowledges the notification.

Figure 22:
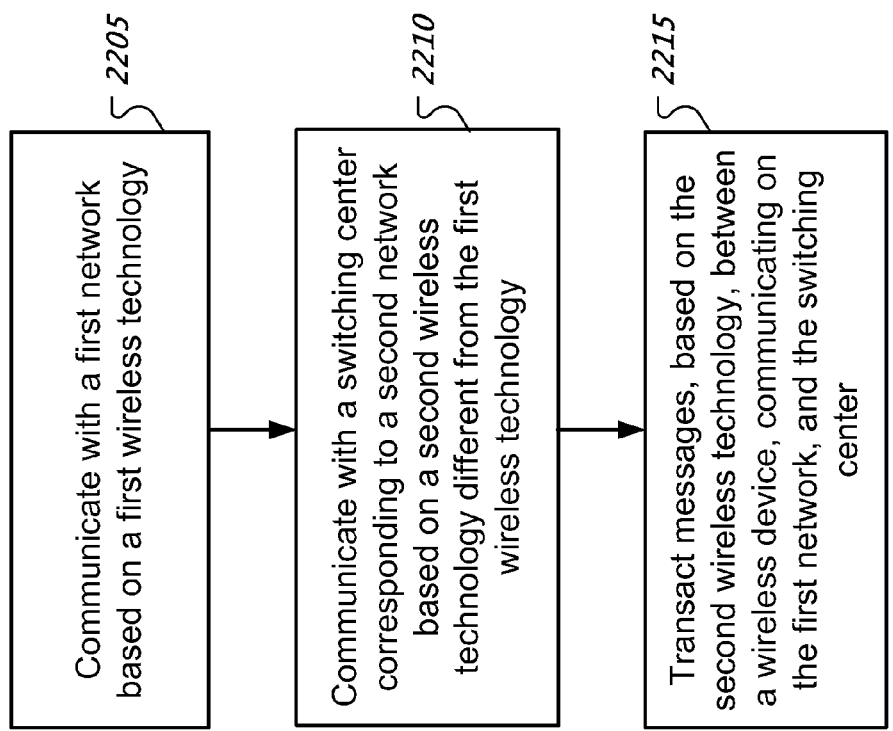
FIG. 22 shows an example of a communication process.

FIG. 22 shows an example of a communication process. A communication process can include communicating with a first network based on a first wireless technology (2205). A communication process can include communicating with a switching center corresponding to a second network based on a second wireless technology different from the first wireless technology (2210). A communication process can include transacting messages, based on the second wireless technology, between a wireless device, communicating on the first network, and the switching center (2215).

A radio station such as a base station or a wireless device can include processor electronics such as a microprocessor that implements methods such as one or more of the techniques presented in this document. A radio station can include transceiver electronics to send and/or receive wireless signals over one or more communication interfaces such as an antenna. A radio station can include other communication interfaces for transmitting and receiving data. A radio station can include one or more memories configured to store information such as data and/or instructions.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electro-magnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A system for wireless communications, comprising:
circuitry for determining a priority order between a first wireless technology and a second wireless technology, wherein the first wireless technology is different from the second wireless technology and the first wireless technology has a higher priority than the second wireless technology;
circuitry to communicate, based on the determination that the first wireless technology has the higher priority than the second wireless technology, with a base station based on the first wireless technology; and
circuitry to transact messages, based on the second wireless technology, with an interworking service that is in communication with a switching center associated with the second wireless technology
wherein the first wireless technology comprises a Code Division Multiple Access 2000 (CDMA2000) technology and the second technology comprises a Long-Term Evolution (LTE) technology;
wherein the circuitry to communicate with the base station based on the first wireless technology includes a CDMA base station controller (BSC),
wherein the circuitry to transact messages based on the second wireless technology includes a Mobility Management Entity (MME), a serving gateway (SGW) and a packet data network gateway (PDN-GW), and
the system includes an interworking service (IWS) module in communication with the CDMA BSC and the MME to provide the interworking service for communications to the wireless device served by the system via either the CDMA 2000 technology or the LTE technology
wherein the IWS module uses a signal adaptation protocol to encapsulate messages in communicating with a wireless device served by the system.

2. The system as in claim 1, wherein:
the messages encapsulated by the IWS module include CDMA registration messages, Short Message Service (SMS) messages, and/or CDMA paging messages.

3. The system as in claim 1, wherein:
the signal adaptation protocol includes message fields to support duplicated message detection and acknowledgement (ACK) based retransmission of a message.

4. The system as in claim 1, wherein
the IWS module provides a tunnel based on the LTE technology for transmitting a CDMA message to a wireless device for a voice service in a mobile terminated (MT) voice call or a mobile originated (MO) call.

5. The system as in claim 4, wherein:
the IWS module tunnels a registration message, a Short Message Service (SMS) message, and a handoff direction message via the CDMA 2000 technology at a wireless device while the wireless device is served by the LTE technology.

6. A system for wireless communications, comprising:
circuitry for determining a priority order between a first wireless technology and a second wireless technology, wherein the first wireless technology is different from the second wireless technology and the first wireless technology has a higher priority than the second wireless technology;
circuitry to communicate, based on the determination that the first wireless technology has a higher priority than the second wireless technology, with a base station based on a first wireless technology; and
circuitry to transact messages, based on the second wireless technology, with an interworking service that is in communication with a switching center associated with the second wireless technology;
wherein:
the first wireless technology comprises a Code Division Multiple Access 2000 1× (CDMA2000 1×) technology and the second technology comprises a CDMA2000 High Rate Packet Data (HRPD) technology,
the circuitry to communicate with the base station based on the first wireless technology includes a CDMA base station controller (BSC),
the circuitry to transact messages based on the second wireless technology includes an HRPD serving gateway (HSGW), and
the system includes an interworking service (IWS) module in communication with the CDMA BSC to provide the interworking service for communications to a wireless device served by the system via either the CDMA2000 1× technology or the HRPD technology; and wherein:

the IWS module uses a signal adaptation protocol to encapsulate messages in communicating with a wireless device served by the system.

7. The system as in claim 6, wherein:

the messages encapsulated by the IWS module include CDMA registration messages, Short Message Service (SMS) messages, Extended Channel Assignment Message (ECAM), CDMA Paging and/or Paging Response messages.

8. The system as in claim 6, wherein:

the signal adaptation protocol includes message fields to support duplicated message detection and acknowledgement (ACK) based retransmission of a message.

9. A system for wireless communications, comprising:

circuitry for determining a priority order between a first wireless technology and a second wireless technology, wherein the first wireless technology is different from the second wireless technology and the first wireless technology has a higher priority than the second wireless technology;

circuitry to communicate, based on the determination that the first wireless technology has the higher priority than the second wireless technology, with a base station based on the first wireless technology; and circuitry to transact messages, based on the second wireless technology, with an interworking service that is in communication with a switching center associated with the second wireless technology;

wherein:

the first wireless technology comprises a Code Division Multiple Access 2000 1× (CDMA2000 1×) technology and the second technology comprises a CDMA2000 High Rate Packet Data (HRPD) technology, the circuitry to communicate with the base station based on the first wireless technology includes a CDMA base station controller (BSC), the circuitry to transact messages based on the second wireless technology includes an HRPD serving gateway (HSGW), and the system includes an interworking service (IWS) module in communication with the CDMA BSC to provide the interworking service for communications to a wireless device served by the system via either the CDMA2000 1× technology or the HRPD technology; and wherein the IWS module provides a tunnel based on the CDMA 2000 HRPD technology for transmitting a message to the wireless device for a voice service in a mobile terminated (MT) voice call or a mobile originated (MO) call.

10. The system as in claim 9, wherein:

the IWS module tunnels a registration message, a Short Message Service (SMS) message, and a handoff direction message via the CDMA 2000 1× technology at a wireless device while the wireless device is served via the CDMA2000 HRPD technology.

11. A system for wireless communications, comprising:

one or more first base stations forming a first radio access network to provide wireless communications based on a first wireless technology;

one or more second base stations forming a second radio access network to provide wireless communications based on a second wireless technology which is different from the first wireless technology, and an interworking service (IWS) module that is configured to provide the interworking between the first and second radio access networks for communications to a wireless device served by the system via either the first wireless technology or the second wireless technology, and uses a signal adaptation protocol to encapsulate messages in communicating with a wireless device served by the system;

wherein the signal adaptation protocol is configured to include a set of pre-defined message types for communications under the first wireless technology, and the IWS module is configured to use the set of pre-defined message types to filter a message to be transmitted via the signal adaptation protocol; and to reject the received message that is not in the set of pre-defined message types via responding to a rejection message of the signal adaptation protocol.

12. The system as in claim 11, wherein:

the IWS module provides a tunnel for transmitting a message via the second radio access network to a wireless device for a voice service provided by the first wireless technology in a mobile terminated (MT) voice call or a mobile originated (MO) call.

13. The system as in claim 11, wherein:

the first wireless technology is a Code Division Multiple Access 2000 1× (CDMA2000 1×) technology and the second technology is a Long-Term Evolution (LTE) technology.

14. The system as in claim 11, wherein:

the first wireless technology is a Code Division Multiple Access 2000 1× (CDMA2000 1×) technology and the second technology is a CDMA2000 High Rate Packet Data (HRPD) technology.

15. The system as in claim 11, wherein:

the signal adaptation protocol is configured to include a transfer message to encapsulate a message for communications under the first wireless technology over a channel under the second wireless technology, and a respective acknowledgment message to respond to a received transfer message.

16. The system as in claim 15, wherein:

the IWS module is configured to use the transfer message and the respective acknowledgment message to detect duplicated messages and to perform retransmission of a message.

17. The system as in claim 11, comprising:

one or more third base stations forming a third radio access network to provide wireless communications based on a third wireless technology which is different from the first and second wireless technologies, wherein the IWS module is configured to provide the interworking between the first, second and third radio access networks for communications to a wireless device served by the system via either one of the first, second and third wireless technologies.

18. A wireless communication device for wirelessly communicating based on a first wireless technology and a second wireless technology different from the first wireless technology, comprising:

a first communication mechanism that communicates with one or more first base stations forming a first radio access network of a wireless communication system to provide wireless communications based on the first wireless technology;

a second communication mechanism that communicates with one or more second base stations forming a second radio access network of the wireless communication system to provide wireless communications based on the second wireless technology; and a message generation mechanism that operates based on a signal adaptation protocol to encapsulate messages in communicating via the first wireless technology or the second wireless technology and supports switching wireless communications between the first wireless technology and the second wireless technology;

wherein the signal adaptation protocol includes a logical channel field that indicates a logical channel relationship between a given message transmitted using the first wireless technology and a corresponding message transmitted using the second wireless technology.

19. The wireless communication device as in claim 18, wherein:

the wireless communication device is part of a mobile device, a cell phone, or a wireless air card.

20. The wireless communication device as in claim 18, wherein:

the message generation mechanism provides a tunnel over the second wireless technology network for transmitting a message of the first wireless technology for a mobile terminated (MT) voice call or a mobile originated (MO) call to an interworking service (IWS) module that is in the wireless communication system and is configured to provide the interworking between the first and second radio access networks for communications with the wireless communication device.

21. The wireless communication device as in claim 20, wherein:

the first wireless technology is a Code Division Multiple Access 2000 1× (CDMA2000 1×) technology and the second technology is a Long-Term Evolution (LTE) technology.

22. The wireless communication device as in claim 21, wherein:

the message generation mechanism encapsulates and tunnels based on the LTE technology a registration message, a Short Message Service (SMS) message, and Paging Response of CDMA2000 1× at the IWS.

23. The wireless communication device as in claim 20, wherein:

the first wireless technology is a Code Division Multiple Access 2000 1× (CDMA2000 1×) technology and the second technology is a CDMA2000 High Rate Packet Data (HRPD) technology.

24. The wireless communication device as in claim 20, wherein:

the second wireless technology is a Code Division Multiple Access 2000 1× (CDMA2000 1×) technology and the first technology is a CDMA2000 High Rate Packet Data (HRPD) technology.

25. The wireless communication device as in claim 18, wherein:

the signal adaptation protocol includes a message field that supports duplicated message detection.

26. The wireless communication device as in claim 18, wherein:

the signal adaptation protocol includes a message field that supports acknowledgement (ACK) based retransmission of a message.

27. The system of claim 1, wherein the transacted messages include Short Message Service (SMS) messages.

28. The system of claim 1, wherein the transacted messages include paging messages.

29. The system as in claim 1, wherein the IWS module provides a tunnel for transmitting a message via the second wireless technology to a wireless device for a voice service provided by the first wireless technology in a mobile terminated (MT) voice call or a mobile originated (MO) call.

30. The system as in claim 1, wherein the IWS module uses the signal adaptation protocol to include a message field that supports duplicated message detection.

31. The system as in claim 1, wherein the IWS module uses the signal adaptation protocol to include a message field that supports acknowledgement (ACK) based retransmission of a message.

32. The system of claim 1, further comprising:

circuitry to operate the switching center to initiate a changeover from the first network to the second network.

33. The system of claim 6, wherein the transacted messages include Short Message Service (SMS) messages.

34. The system of claim 6, wherein the transacted messages include paging messages.

35. The system as in claim 6, wherein the IWS module provides a tunnel for transmitting a message via the second wireless technology to a wireless device for a voice service provided by the first wireless technology in a mobile terminated (MT) voice call or a mobile originated (MO) call.

36. The system as in claim 6, wherein the IWS module uses the signal adaptation protocol to include a message field that supports duplicated message detection.

37. The system as in claim 6, wherein the IWS module uses the signal adaptation protocol to include a message field that supports acknowledgement (ACK) based retransmission of a message.

38. The system of claim 6, further comprising:

circuitry to operate the switching center to initiate a changeover from the first network to the second network.

39. The system of claim 9, wherein the transacted messages include Short Message Service (SMS) messages.

40. The system of claim 9, wherein the transacted messages include paging messages.

41. The system as in claim 9, wherein the IWS module uses a signal adaptation protocol to include a message field that supports duplicated message detection.

42. The system as in claim 9, wherein the IWS module uses a signal adaptation protocol to include a message field that supports acknowledgement (ACK) based retransmission of a message.

43. The system of claim 9, further comprising:

circuitry to operate the switching center to initiate a changeover from the first network to the second network.

44. A wireless communication device for wirelessly communicating based on a first wireless technology and a second wireless technology different from the first wireless technology, comprising:

transceiver electronics configured to communicate with one or more first base stations forming a first radio access network of a wireless communication system to provide wireless communications based on the first wireless technology;

the transceiver electronics further configured to communicate with one or more second base stations forming a second radio access network of the wireless communication system to provide wireless communications based on the second wireless technology; and processor electronics operable based on a signal adaptation protocol to encapsulate messages in communicating via the first wireless technology or the second wireless technology and supports switching wireless communications between the first wireless technology and the second wireless technology;

wherein the signal adaptation protocol includes a logical channel field that indicates a logical channel relationship between a given message transmitted using the first wireless technology and a corresponding message transmitted using the second wireless technology.

45. The wireless communication device as in claim 44, wherein:

the wireless communication device is part of a mobile device, a cell phone, or a wireless air card.

46. The wireless communication device as in claim 44, wherein:

the processor electronics is operable to provide a tunnel over the second wireless technology network for transmitting a message of the first wireless technology for a mobile terminated (MT) voice call or a mobile originated (MO) call to an interworking service (IWS) module that is in the wireless communication system and is configured to provide the interworking between the first and second radio access networks for communications with the wireless communication device.

47. The wireless communication device as in claim 46, wherein:

the first wireless technology comprises a Code Division Multiple Access 2000 1× (CDMA2000 1×) technology and the second technology comprises a Long-Term Evolution (LTE) technology.

48. The wireless communication device as in claim 47, wherein:

the processor electronics is operable to encapsulate and tunnel based on the LTE technology a registration message, a Short Message Service (SMS) message, and Paging Response of CDMA2000 1× at the IWS.

49. The wireless communication device as in claim 46, wherein:

the first wireless technology comprises a Code Division Multiple Access 2000 1× (CDMA2000 1×) technology and the second technology comprises a CDMA2000 High Rate Packet Data (HRPD) technology.

50. The wireless communication device as in claim 46, wherein:

the second wireless technology is a Code Division Multiple Access 2000 1× (CDMA2000 1×) technology and the first technology is a CDMA2000 High Rate Packet Data (HRPD) technology.

51. The wireless communication device as in claim 44, wherein:

the signal adaptation protocol includes a message field that supports duplicated message detection.

52. The wireless communication device as in claim 44, wherein:

the signal adaptation protocol includes a message field that supports acknowledgement (ACK) based retransmission of a message.

* * * * *